United States Patent
Huang et al.

(10) Patent No.: US 12,328,770 B2
(45) Date of Patent: Jun. 10, 2025

(54) METHOD AND APPARATUS FOR TRANSMITTING RANDOM ACCESS SIGNAL

(71) Applicant: Huawei Technologies Co., Ltd., Shenzhen (CN)

(72) Inventors: Huang Huang, Shenzhen (CN); Mao Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 446 days.

(21) Appl. No.: 17/957,905

(22) Filed: Sep. 30, 2022

(65) Prior Publication Data

US 2023/0043012 A1 Feb. 9, 2023

Related U.S. Application Data

(63) Continuation of application No. PCT/CN2020/084021, filed on Apr. 9, 2020.

(51) Int. Cl.
*H04W 74/0833* (2024.01)
*H04W 74/00* (2009.01)

(52) U.S. Cl.
CPC ..... *H04W 74/0833* (2013.01); *H04W 74/002* (2013.01)

(58) Field of Classification Search
CPC ............. H04W 74/002; H04W 74/0833
See application file for complete search history.

(56) References Cited

U.S. PATENT DOCUMENTS

| | | |
|---|---|---|
| 11,089,579 B2 | 8/2021 | Nam et al. |
| 2015/0003427 A1 | 1/2015 | Wan et al. |
| 2019/0215877 A1* | 7/2019 | Qian .................. H04L 27/2659 |

FOREIGN PATENT DOCUMENTS

| | | |
|---|---|---|
| CN | 103298136 A | 9/2013 |
| CN | 107046729 A | 8/2017 |
| CN | 107197532 A | 9/2017 |
| CN | 108307506 A | 7/2018 |
| CN | 108702753 A | 10/2018 |
| CN | 110062472 A | 7/2019 |
| CN | 110768766 A | 2/2020 |
| EP | 3048851 B1 | 3/2020 |
| WO | 2018131891 A1 | 7/2018 |
| WO | 2018195945 A1 | 11/2018 |
| WO | 2019139426 A1 | 7/2019 |
| WO | 2019216698 A1 | 11/2019 |

OTHER PUBLICATIONS

European search opinion, EP4124148 (Year: 2023).*

(Continued)

*Primary Examiner* — James P Duffy
(74) *Attorney, Agent, or Firm* — SLATER MATSIL, LLP

(57) ABSTRACT

A method and an apparatus for transmitting a random access signal. The method includes receiving configuration information, wherein the configuration information indicates a random access preamble length, a random access signal subcarrier spacing, and a data subcarrier spacing, determining a subcarrier quantity parameter $\bar{K}$ based on at least one of the random access preamble length, the random access signal subcarrier spacing, or the data subcarrier spacing, generating a random access signal based on the subcarrier quantity parameter $\bar{K}$, and sending the random access signal.

16 Claims, 9 Drawing Sheets

(56) References Cited

OTHER PUBLICATIONS

"3rd Generation Partnership Project; Technical Specification Group Radio Access Network; NR; Base Station (BS) radio transmission and reception (Release 16)," 3GPP TS 38.104 V16.3.0, Mar. 2020, 258 pages.
"3rd Generation Partnership Project; Technical Specification Group Radio Access Network; NR; Requirements for support of radio resource management (Release 16)," 3GPP TS 38.133 V16.2.0, Sep. 2019, 1073 pages.
"3rd Generation Partnership Project; Technical Specification Group Radio Access Network; NR; Physical channels and modulation (Release 16)," 3GPP TS 38.211 V16.1.0, Mar. 2020, 130 pages.
"3rd Generation Partnership Project; Technical Specification Group Radio Access Network; NR; Multiplexing and channel coding (Release 16)," 3GPP TS 38.212 V16.1.0, Mar. 2020, 146 pages.
"3rd Generation Partnership Project; Technical Specification Group Radio Access Network; NR; Physical layer procedures for control (Release 16)," 3GPP TS 38.213 V16.1.0, Mar. 2020, 156 pages.
"3rd Generation Partnership Project; Technical Specification Group Radio Access Network; NR; Physical layer procedures for data (Release 16)," 3GPP TS 38.214 V16.1.0, Mar. 2020, 151 pages.
"3rd Generation Partnership Project; Technical Specification Group Radio Access Network; NR; NR and NG-RAN Overall Description; Stage 2 (Release 16)," 3GPP TS 38.300 V16.1.0, Mar. 2020, 133 pages.
"3rd Generation Partnership Project; Technical Specification Group Radio Access Network; NR; Radio Resource Control (RRC) protocol specification (Release 16)," 3GPP TS 38.331 V16.0.0 , Mar. 2020, 835 pages.

* cited by examiner

METHOD AND APPARATUS FOR TRANSMITTING RANDOM ACCESS SIGNAL

CROSS-REFERENCE TO RELATED APPLICATIONS

This application is a continuation of International Application No. PCT/CN2020/084021, filed on Apr. 9, 2020, the disclosure of which is hereby incorporated by reference in its entirety.

TECHNICAL FIELD

This application relates to the communications field, and more specifically, to a method and an apparatus for transmitting a random access signal.

BACKGROUND

In a conventional solution, a terminal may access a network device by using a two-step random access type or a four-step random access type. A random access signal used for random access may be generated by using a random access formula. The random access signal may be a message 1 in the four-step random access type, or may be a message A in the two-step random access type.

In addition, there is a variable subcarrier quantity parameter in the random access formula, and the subcarrier quantity parameter is used to indicate a frequency domain interval (which may also be referred to as a "guard interval") between a random access signal and a data signal. Therefore, to ensure accuracy of a generated random access signal to improve random access efficiency, how to determine the subcarrier quantity parameter needs to be resolved urgently.

SUMMARY

This application provides a method and an apparatus for transmitting a random access signal, to obtain an accurate subcarrier quantity parameter, thereby improving random access efficiency.

According to a first aspect, a method for transmitting a random access signal is provided. The method includes: receiving configuration information, where the configuration information is used to indicate a random access preamble length, a random access signal subcarrier spacing, and a data subcarrier spacing; determining a subcarrier quantity parameter based on at least one of the random access preamble length, the random access signal subcarrier spacing, and the data subcarrier spacing, where the subcarrier quantity parameter includes a first subcarrier quantity used to indicate a frequency resource start location of a random access preamble and a frequency resource start location of a physical random access channel, and/or a second subcarrier quantity used to indicate a frequency resource end location of the random access preamble and a frequency resource end location of the physical random access channel; generating a random access signal based on the subcarrier quantity parameter; and sending the random access signal.

A terminal receives the configuration information, and determines the subcarrier quantity parameter with reference to at least one of the random access preamble length, the random access signal subcarrier spacing, and the data subcarrier spacing that are indicated by the configuration information. In this way, the terminal can generate an accurate random access signal, thereby improving random access efficiency.

In some possible implementations, a value of the random access signal subcarrier spacing is any one of 120 kHz, 240 kHz, 480 kHz, 960 kHz, 1920 kHz, and 3840 kHz.

Embodiments of this application may be applied to a scenario less than 52.6 GHz. The subcarrier spacing may alternatively be greater than or equal to 240 kHz, that is, this application may also be applied to a scenario greater than or equal to 52.6 GHz, thereby extending an application range of random access.

In some possible implementations, a value of the data subcarrier spacing is any one of 240 kHz, 480 kHz, 960 kHz, 1920 kHz, and 3840 kHz.

This application may be applied to a scenario greater than or equal to 52.6 GHz, to implement random access, thereby extending an application range of random access.

In some possible implementations, a value of the subcarrier quantity parameter is anyone of −15, −7, −5, −3, −1, 0, 1, 2, 3, 19, 23, 83, and 107.

Different values of the subcarrier quantity parameter may flexibly adjust the first subcarrier quantity and the second subcarrier quantity, that is, in embodiments of this application, sizes of guard intervals may be flexibly adjusted, to implement applicability to different scenarios.

In some possible implementations, the determining a subcarrier quantity parameter based on at least one of the random access preamble length, the random access signal subcarrier spacing, and the data subcarrier spacing includes: determining a total subcarrier quantity frequency domain width based on the random access preamble length, the random access signal subcarrier spacing, and the data subcarrier spacing; and determining the subcarrier quantity parameter based on the total subcarrier quantity frequency domain width, the random access signal subcarrier spacing, and the data subcarrier spacing.

The terminal may first determine the total subcarrier quantity frequency domain width, and then further determine the subcarrier quantity parameter, that is, may indirectly obtain the subcarrier quantity parameter. Therefore, embodiments of this application provide an implementation of determining a subcarrier quantity parameter, to help generate an accurate random access signal, and further help improve random access efficiency.

In some possible implementations, the determining a subcarrier quantity parameter based on at least one of the random access preamble length, the random access signal subcarrier spacing, and the data subcarrier spacing includes: determining the subcarrier quantity parameter in the second target parameter based on the random access signal subcarrier spacing and the data subcarrier spacing in the first target parameter.

The terminal may determine the subcarrier quantity parameter with reference to the random access signal subcarrier spacing and the data subcarrier spacing. For example, the terminal may store a mapping relationship of the random access signal subcarrier spacing and the data subcarrier spacing with the subcarrier quantity parameter. Therefore, embodiments of this application provide another implementation of determining a subcarrier quantity parameter, to help generate an accurate random access signal, and further help improve random access efficiency.

In some possible implementations, the first subcarrier quantity and the second subcarrier quantity are the same.

A guard interval 1 and a guard interval 2 may be the same, so that the terminal may implement same impact on data demodulation at two ends of the random access signal, thereby reducing complexity of the terminal.

In some possible implementations, the determining the subcarrier quantity parameter based on the total subcarrier quantity frequency domain width, the random access signal subcarrier spacing, and the data subcarrier spacing includes: the subcarrier quantity parameter $\bar{k}$ conforms to:

$$\bar{k} = \frac{\left(\frac{GP}{2} - \frac{\Delta f}{2}\right)}{\Delta f_{RA}} + 0.5,$$

where GP represents the total subcarrier quantity frequency domain width, $\Delta f$ represents the data subcarrier spacing, $\Delta f_{RA}$ represents the random access signal subcarrier spacing, and $\bar{k}$ represents the subcarrier quantity parameter.

The terminal or a network device may determine $\bar{k}$ by using the foregoing formula, to adjust the guard interval 1 and the guard interval 2 to be the same, so that same impact is implemented on data demodulation at two ends of the random access signal, thereby reducing complexity of the terminal.

In some possible implementations, $L_{RA}$, $\Delta f$, $\Delta f_{RA}$, and $\bar{k}$ meet at least one of the following correspondences:

| $L_{RA}$ | $\Delta f_{RA}$ | $\Delta f$ | $\bar{k}$ |
|---|---|---|---|
| 139 | 240 | 240 | 2 |
| 139 | 480 | 480 | 2 |
| 139 | 960 | 960 | 2 |
| 139 | 1920 | 1920 | 2 |
| 139 | 3840 | 3840 | 2 |
| 571 | 240 | 240 | 2 |
| 571 | 960 | 960 | 2 |
| 571 | 1920 | 1920 | 2 |
| 571 | 3840 | 3840 | 2 |
| 1151 | 480 | 480 | 0 |
| 1151 | 960 | 960 | 0 |
| 1151 | 1920 | 1920 | 0 |
| 1151 | 3840 | 3840 | 0 | where $\Delta f$ represents the data subcarrier spacing, $\Delta f_{RA}$ represents the random access signal subcarrier spacing, $\bar{k}$ represents the subcarrier quantity parameter, and $L_{RA}$ represents the random access preamble length.

The terminal or the network device may determine $\bar{k}$ by using the foregoing table, to adjust the guard interval 1 and the guard interval 2 to be the same, so that same impact is implemented on data demodulation at two ends of the random access signal, thereby reducing complexity of the terminal.

In some possible implementations, $L_{RA}$, $\Delta f$, $\Delta f_{RA}$, and $\bar{k}$ meet at least one of the following correspondences:

| $L_{RA}$ | $\Delta f_{RA}$ | $\Delta f$ | $\bar{k}$ |
|---|---|---|---|
| 139 | 120 | 240 | 2 |
| 139 | 120 | 480 | 1 |
| 139 | 240 | 480 | 2 |
| 139 | 120 | 960 | 23 |
| 139 | 240 | 960 | 1 |
| 139 | 480 | 960 | 2 |
| 139 | 120 | 1920 | 19 |
| 139 | 240 | 1920 | 23 |
| 139 | 480 | 1920 | 1 |
| 139 | 960 | 1920 | 2 |
| 139 | 120 | 3840 | 107 |
| 139 | 240 | 3840 | 19 |
| 139 | 480 | 3840 | 23 |
| 139 | 960 | 3840 | 1 |
| 139 | 1920 | 3840 | 2 |
| 571 | 120 | 240 | 2 |
| 571 | 120 | 480 | 1 |
| 571 | 240 | 480 | 2 |
| 571 | 120 | 960 | -1 |
| 571 | 240 | 960 | 1 |
| 571 | 480 | 960 | 2 |
| 571 | 120 | 1920 | -5 |
| 571 | 240 | 1920 | -1 |
| 571 | 480 | 1920 | 1 |
| 571 | 960 | 1920 | 2 |
| 571 | 120 | 3840 | 83 |
| 571 | 240 | 3840 | -5 |
| 571 | 480 | 3840 | -1 |
| 571 | 960 | 3840 | 1 |
| 571 | 1920 | 3840 | 2 |
| 1151 | 120 | 240 | 0 |
| 1151 | 120 | 480 | -1 |
| 1151 | 240 | 480 | 0 |
| 1151 | 120 | 960 | -3 |
| 1151 | 240 | 960 | -1 |
| 1151 | 480 | 960 | 0 |
| 1151 | 120 | 1920 | -7 |
| 1151 | 240 | 1920 | -3 |
| 1151 | 480 | 1920 | -1 |
| 1151 | 960 | 1920 | 0 |
| 1151 | 120 | 3840 | -15 |
| 1151 | 240 | 3840 | -7 |
| 1151 | 480 | 3840 | -3 |
| 1151 | 960 | 3840 | -1 |
| 1151 | 1920 | 3840 | 0 | where $\Delta f$ represents the data subcarrier spacing, $\Delta f_{RA}$ represents the random access signal subcarrier spacing, $\bar{k}$ represents the subcarrier quantity parameter, and $L_{RA}$ represents the random access preamble length.

The terminal or the network device may determine $\bar{k}$ by using the foregoing table, to adjust the guard interval 1 and the guard interval 2 to be the same, so that same impact is implemented on data demodulation at two ends of the random access signal, thereby reducing complexity of the terminal.

In some possible implementations, the first subcarrier quantity and the total subcarrier quantity frequency domain width are the same, and the second subcarrier quantity is zero.

The guard intervals of the random access signal may be set to a maximum at one end and zero at the other end. For example, the guard interval 1 is a maximum, and the guard interval 2 is zero. In this way, impact on other frequency division data may be minimized by the guard interval 1, thereby improving data demodulation performance. In addition, for the guard interval 2, the network device may reduce interference by performing scheduling to avoid data transmission or scheduling low MCS data.

In some possible implementations, the determining the subcarrier quantity parameter in the target second parameter based on the total subcarrier quantity frequency domain width, the random access signal subcarrier spacing, and the data subcarrier spacing includes:
the subcarrier quantity parameter $\bar{k}$ conforms to:

$$\bar{k} = \frac{\left(GP - \frac{\Delta f}{2}\right)}{\Delta f_{RA}} + 0.5,$$

where GP represents the total subcarrier quantity frequency domain width, Δf represents the data subcarrier spacing, $\Delta f_{RA}$ represents the random access signal subcarrier spacing, and $\bar{k}$ represents the subcarrier quantity parameter.

The terminal or the network device may meet the foregoing relationship by setting $\bar{k}$, so that the guard interval 1 is a maximum, and the guard interval 2 is zero. In this way, impact on other frequency division data is minimized by the guard interval 1, thereby improving data demodulation performance.

In some possible implementations, the determining the subcarrier quantity parameter in the target second parameter based on the total subcarrier quantity frequency domain width, the random access signal subcarrier spacing, and the data subcarrier spacing includes:

the subcarrier quantity parameter $\bar{k}$ conforms to:

$$\bar{k} = \frac{\left(GP + \frac{\Delta f}{2}\right)}{\Delta f_{RA}} + 0.5,$$

where GP represents the total subcarrier quantity frequency domain width, Δf represents the data subcarrier spacing, $\Delta f_{RA}$ represents the random access signal subcarrier spacing, and $\bar{k}$ represents the subcarrier quantity parameter.

The terminal or the network device may meet the foregoing relationship by setting $\bar{k}$, so that the guard interval 1 is a maximum, and the guard interval 2 is zero. In this way, impact on other frequency division data is minimized by the guard interval 1, thereby improving data demodulation performance.

In some possible implementations, the first subcarrier quantity is zero, and the second subcarrier quantity and the total subcarrier quantity frequency domain width are the same.

The guard intervals of the random access signal may be set to a maximum at one end and zero at the other end. For example, the guard interval 2 is a maximum, and the guard interval 1 is zero. In this way, impact on other frequency division data may be minimized by the guard interval 2, thereby improving data demodulation performance. In addition, for the guard interval 1, the network device may reduce interference by performing scheduling to avoid data transmission or scheduling low MCS data.

In some possible implementations, the determining the subcarrier quantity parameter based on the random access signal subcarrier spacing and the data subcarrier spacing includes:

the subcarrier quantity parameter $\bar{k}$ conforms to:

$$\bar{k} = \frac{\left(0 - \frac{\Delta f}{2}\right)}{\Delta f_{RA}} + 0.5,$$

where Δf represents the data subcarrier spacing, $\Delta f_{RA}$ represents the random access signal subcarrier spacing, and $\bar{k}$ represents the subcarrier quantity parameter.

The terminal or the network device may meet the foregoing relationship by setting $\bar{k}$, so that the guard interval 2 is a maximum, and the guard interval 1 is zero. In this way, impact on other frequency division data is minimized by the guard interval 2, thereby improving data demodulation performance.

In some possible implementations, the determining the subcarrier quantity parameter based on the random access signal subcarrier spacing and the data subcarrier spacing includes:

the subcarrier quantity parameter $\bar{k}$ conforms to:

$$\bar{k} = \frac{\Delta f}{2\Delta f_{RA}} + 0.5,$$

where Δf represents the data subcarrier spacing, $\Delta f_{RA}$ represents the random access signal subcarrier spacing, and $\bar{k}$ represents the subcarrier quantity parameter.

The terminal or the network device may meet the foregoing relationship by setting $\bar{k}$, so that the guard interval 2 is a maximum, and the guard interval 1 is zero. In this way, impact on other frequency division data is minimized by the guard interval 2, thereby improving data demodulation performance.

According to a second aspect, a method for transmitting a random access signal is provided. The method includes: receiving configuration information, where the configuration information is used to indicate a random access preamble length, a random access signal subcarrier spacing, and a data subcarrier spacing, at least one of the random access preamble length, the random access signal subcarrier spacing, and the data subcarrier spacing is used to determine a subcarrier quantity parameter, the subcarrier quantity parameter is used to generate a random access signal, and the subcarrier quantity parameter includes a first subcarrier quantity used to indicate a frequency resource start location of a random access preamble and a frequency resource start location of a physical random access channel, and/or a second subcarrier quantity used to indicate a frequency resource end location of the random access preamble and a frequency resource end location of the physical random access channel; and sending the random access signal.

A terminal receives the configuration information, and determines the subcarrier quantity parameter with reference to at least one of the random access preamble length, the random access signal subcarrier spacing, and the data subcarrier spacing that are indicated by the configuration information. In this way, the terminal can generate an accurate random access signal, thereby improving random access efficiency.

In some possible implementations, a value of the random access signal subcarrier spacing is any one of 120 kHz, 240 kHz, 480 kHz, 960 kHz, 1920 kHz, and 3840 kHz.

In some possible implementations, a value of the data subcarrier spacing is any one of 240 kHz, 480 kHz, 960 kHz, 1920 kHz, and 3840 kHz.

In some possible implementations, a value of the subcarrier quantity parameter is anyone of −15, −7, −5, −3, −1, 0, 1, 2, 3, 19, 23, 83, and 107.

In some possible implementations, the first subcarrier quantity and the second subcarrier quantity are the same.

In some possible implementations, the random access signal subcarrier spacing, the data subcarrier spacing, and the subcarrier quantity parameter meet the following relationship:

$$\bar{k} = \frac{\left(\frac{GP}{2} - \frac{\Delta f}{2}\right)}{\Delta f_{RA}} + 0.5, \text{ and}$$

$$GP = \text{ceil}(L_{RA} * \Delta f_{RA} / (\Delta f * N)) * (\Delta f * N) - L_{RA} * \Delta f_{RA},$$

where Δf represents the data subcarrier spacing, Δf$_{RA}$ represents the random access signal subcarrier spacing, $\bar{k}$ represents the subcarrier quantity parameter, and L$_{RA}$ represents the random access preamble length.

In some possible implementations, the first subcarrier quantity and the total subcarrier quantity frequency domain width are the same, and the second subcarrier quantity is zero.

In some possible implementations, the determining the subcarrier quantity parameter in the target second parameter based on the total subcarrier quantity frequency domain width, the random access signal subcarrier spacing, and the data subcarrier spacing includes:

the subcarrier quantity parameter $\bar{k}$ conforms to:

$$\bar{k} = \frac{\left(GP - \frac{\Delta f}{2}\right)}{\Delta f_{RA}} + 0.5,$$

where GP represents the total subcarrier quantity frequency domain width, Δf represents the data subcarrier spacing, Δf$_{RA}$ represents the random access signal subcarrier spacing, and $\bar{k}$ represents the subcarrier quantity parameter.

In some possible implementations, the first subcarrier quantity is zero, and the second subcarrier quantity and the total subcarrier quantity frequency domain width are the same.

In some possible implementations, the random access signal subcarrier spacing, the data subcarrier spacing, and the subcarrier quantity parameter meet the following relationship:

$$\bar{k} = \frac{\left(0 - \frac{\Delta f}{2}\right)}{\Delta f_{RA}} + 0.5,$$

where Δf represents the data subcarrier spacing, Δf$_{RA}$ represents the random access signal subcarrier spacing, and $\bar{k}$ represents the subcarrier quantity parameter.

According to a third aspect, a method for transmitting a random access signal is provided. The method includes: sending configuration information, where the configuration information is used to indicate a random access preamble length, a random access signal subcarrier spacing, and a data subcarrier spacing; and receiving a random access signal, where the random access signal is generated based on a subcarrier quantity parameter, the subcarrier quantity parameter is determined by at least one of the random access preamble length, the random access signal subcarrier spacing, and the data subcarrier spacing, and the subcarrier quantity parameter includes a first subcarrier quantity used to indicate a frequency resource start location of a random access preamble and a frequency resource start location of a physical random access channel, and/or a second subcarrier quantity used to indicate a frequency resource end location of the random access preamble and a frequency resource end location of the physical random access channel.

A network device sends, to a terminal, the configuration information used to indicate the random access preamble length, the random access signal subcarrier spacing, and the data subcarrier spacing, so that the terminal may determine the subcarrier quantity parameter with reference to at least one of the random access preamble length, the random access signal subcarrier spacing, and the data subcarrier spacing. That is, the configuration information sent by the network device can enable the terminal to generate an accurate random access signal, thereby improving random access efficiency.

In some possible implementations, a value of the random access signal subcarrier spacing is any one of 120 kHz, 240 kHz, 480 kHz, 960 kHz, 1920 kHz, and 3840 kHz.

In some possible implementations, a value of the data subcarrier spacing is any one of 240 kHz, 480 kHz, 960 kHz, 1920 kHz, and 3840 kHz.

In some possible implementations, a value of the subcarrier quantity parameter is anyone of −15, −7, −5, −3, −1, 0, 1, 2, 3, 19, 23, 83, and 107.

In some possible implementations, the first subcarrier quantity and the second subcarrier quantity are the same.

In some possible implementations, the random access signal subcarrier spacing, the data subcarrier spacing, and the subcarrier quantity parameter meet the following relationship:

$$\bar{k} = \frac{\left(\frac{GP}{2} - \frac{\Delta f}{2}\right)}{\Delta f_{RA}} + 0.5, \text{ and}$$

$$GP = \text{ceil}\left(L_{RA} * \Delta f_{RA} / (\Delta f * N)\right) * (\Delta f * N) - L_{RA} * \Delta f_{RA},$$

where Δf represents the data subcarrier spacing, Δf$_{RA}$ represents the random access signal subcarrier spacing, and $\bar{k}$ represents the subcarrier quantity parameter.

In some possible implementations, the first subcarrier quantity and the total subcarrier quantity frequency domain width are the same, and the second subcarrier quantity is zero.

In some possible implementations, the random access signal subcarrier spacing, the data subcarrier spacing, and the subcarrier quantity parameter meet the following relationship:

$$\bar{k} = \frac{\left(GP - \frac{\Delta f}{2}\right)}{\Delta f_{RA}} + 0.5, \text{ and}$$

$$GP = \text{ceil}\left(L_{RA} * \Delta f_{RA} / (\Delta f * N)\right) * (\Delta f * N) - L_{RA} * \Delta f_{RA},$$

where Δf represents the data subcarrier spacing, Δf$_{RA}$ represents the random access signal subcarrier spacing, and $\bar{k}$ represents the subcarrier quantity parameter.

In some possible implementations, the random access signal subcarrier spacing, the data subcarrier spacing, and the subcarrier quantity parameter meet the following relationship:

$$\bar{k} = \frac{\left(GP + \frac{\Delta f}{2}\right)}{\Delta f_{RA}} + 0.5, \text{ and}$$

$$GP = \text{ceil}\left(L_{RA} * \Delta f_{RA} / (\Delta f * N)\right) * (\Delta f * N) - L_{RA} * \Delta f_{RA},$$

where Δf represents the data subcarrier spacing, Δf$_{RA}$ represents the random access signal subcarrier spacing, and $\bar{k}$ represents the subcarrier quantity parameter.

In some possible implementations, the first subcarrier quantity is zero, and the second subcarrier quantity and the total subcarrier quantity frequency domain width are the same.

In some possible implementations, the random access signal subcarrier spacing, the data subcarrier spacing, and the subcarrier quantity parameter meet the following relationship:

$$\bar{k} = \frac{\left(0 - \frac{\Delta f}{2}\right)}{\Delta f_{RA}} + 0.5,$$

where $\Delta f$ represents the data subcarrier spacing, $\Delta f_{RA}$ represents the random access signal subcarrier spacing, and $\bar{k}$ represents the subcarrier quantity parameter.

In some possible implementations, the random access signal subcarrier spacing, the data subcarrier spacing, and the subcarrier quantity parameter meet the following relationship:

$$\bar{k} = \frac{\Delta f}{2\Delta f_{RA}} + 0.5,$$

where $\Delta f$ represents the data subcarrier spacing, $\Delta f_{RA}$ represents the random access signal subcarrier spacing, and $\bar{k}$ represents the subcarrier quantity parameter.

According to a fourth aspect, an apparatus for transmitting a random access signal is provided. The apparatus may be a terminal, or may be a chip in the terminal. The apparatus has functions of implementing the first aspect and the possible implementations. The functions may be implemented by hardware, or may be implemented by hardware executing corresponding software. The hardware or the software includes one or more modules corresponding to the functions.

In a possible design, the apparatus includes a transceiver module and a processing module. The transceiver module may include a receiving module and a sending module. The transceiver module may be, for example, at least one of a transceiver, a receiver, or a transmitter. The transceiver module may include a radio frequency circuit or an antenna. The processing module may be a processor. Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from elsewhere, to enable the apparatus to perform the communications method in the first aspect and the possible implementations. In this design, the apparatus may be a terminal.

In another possible design, when the apparatus is a chip, the chip includes a transceiver module and a processing module. The transceiver module may include a receiving module and a sending module. The transceiver module may be, for example, an input/output interface, a pin, or a circuit on the chip. The processing module may be, for example, a processor. The processing module may execute instructions, to enable the chip in the terminal to perform the communications method in the first aspect and any possible implementation. Optionally, the processing module may execute instructions in a storage module. The storage module may be a storage module, for example, a register or a cache, in the chip. Alternatively, the storage module may be located in the communications device but located outside the chip, for example, a read-only memory (read-only memory, ROM) or another type of static storage device that can store static information and instructions, or a random access memory (random access memory, RAM).

Any processor mentioned above may be a general-purpose central processing unit (CPU), a microprocessor, an application-specific integrated circuit (application-specific integrated circuit, ASIC), or one or more integrated circuits configured to control program execution of the communications methods in the foregoing aspects.

According to a fifth aspect, an apparatus for transmitting a random access signal is provided. The apparatus may be a terminal, or may be a chip in the terminal. The apparatus has functions of implementing the second aspect and the possible implementations. The functions may be implemented by hardware, or may be implemented by hardware executing corresponding software. The hardware or the software includes one or more modules corresponding to the functions.

In a possible design, the apparatus includes a transceiver module. Optionally, the apparatus further includes a processing module. The transceiver module may include a receiving module and a sending module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from elsewhere, to enable the apparatus to perform the communications method in the second aspect and the possible implementations. In this design, the apparatus may be a terminal.

In another possible design, when the apparatus is a chip, the chip includes a transceiver module. Optionally, the chip further includes a processing module. The transceiver module may include a receiving module and a sending module. The transceiver module may be, for example, an input/output interface, a pin, or a circuit on the chip. The processing module may be, for example, a processor. The processing module may execute instructions, to enable the chip in the terminal to perform the communications method in the second aspect and any possible implementation.

Optionally, the processing module may execute instructions in a storage module. The storage module may be a storage module, for example, a register or a cache, in the chip. Alternatively, the storage module may be located in the communications device but located outside the chip, for example, a read-only memory (read-only memory, ROM) or another type of static storage device that can store static information and instructions, or a random access memory (random access memory, RAM).

Any processor mentioned above may be a general-purpose central processing unit (CPU), a microprocessor, an application-specific integrated circuit (application-specific integrated circuit, ASIC), or one or more integrated circuits configured to control program execution of the communications methods in the foregoing aspects.

According to a sixth aspect, an apparatus for transmitting a random access signal is provided. The apparatus may be a network device, or may be a chip in the network device. The apparatus has functions of implementing the third aspect and the possible implementations. The functions may be implemented by hardware, or may be implemented by hardware executing corresponding software. The hardware or the software includes one or more modules corresponding to the functions.

In a possible design, the apparatus includes a transceiver module. Optionally, the apparatus may further include a processing module. The transceiver module may include a receiving module and a sending module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from elsewhere, to enable the apparatus to perform the method in the third aspect or any possible implementation of the third aspect. In this design, the apparatus may be a network device.

In another possible design, when the apparatus is a chip, the chip includes a transceiver module. Optionally, the apparatus may further include a processing module. The transceiver module may include a receiving module and a sending module. The transceiver module may be, for example, an input/output interface, a pin, or a circuit on the chip. The processing module may be, for example, a processor. The processing module may execute instructions, to enable the chip in the network device to perform the communications method in the third aspect and any possible implementation.

Optionally, the processing module may execute instructions in a storage module. The storage module may be a storage module, for example, a register or a cache, in the chip. Alternatively, the storage module may be located in the communications device but located outside the chip, for example, a ROM or another type of static storage device that can store static information and instructions, or a RAM.

Any processor mentioned above may be a CPU, a microprocessor, an application-specific integrated circuit ASIC, or one or more integrated circuits configured to control program execution of the communications methods in the foregoing aspects.

According to a seventh aspect, a computer storage medium is provided. The computer storage medium stores program code, and the program code is used to indicate instructions for performing the method in the first aspect or the second aspect, and any possible implementation of the first aspect or the second aspect.

According to an eighth aspect, a computer storage medium is provided. The computer storage medium stores program code, and the program code is used to indicate instructions for performing the method in the third aspect and any possible implementation of the third aspect.

According to a ninth aspect, a computer program product including instructions is provided. When the computer program product runs on a computer, the computer is enabled to perform the method in the first aspect or the second aspect, or any possible implementation of the first aspect or the second aspect.

According to a tenth aspect, a computer program product including instructions is provided. When the computer program product runs on a computer, the computer is enabled to perform the method in the third aspect or any possible implementation of the third aspect.

According to an eleventh aspect, a communications system is provided. The communications system includes the apparatus according to the fourth aspect and the apparatus according to the sixth aspect.

According to a twelfth aspect, a communications system is provided. The communications system includes the apparatus according to the fifth aspect and the apparatus according to the sixth aspect.

Based on the foregoing technical solutions, the terminal receives the configuration information, and determines the subcarrier quantity parameter with reference to at least one of the random access preamble length, the random access signal subcarrier spacing, and the data subcarrier spacing that are indicated by the configuration information. In this way, the terminal can generate an accurate random access signal, thereby improving random access efficiency.

DETAILED DESCRIPTION OF ILLUSTRATIVE EMBODIMENTS

Figure 1:
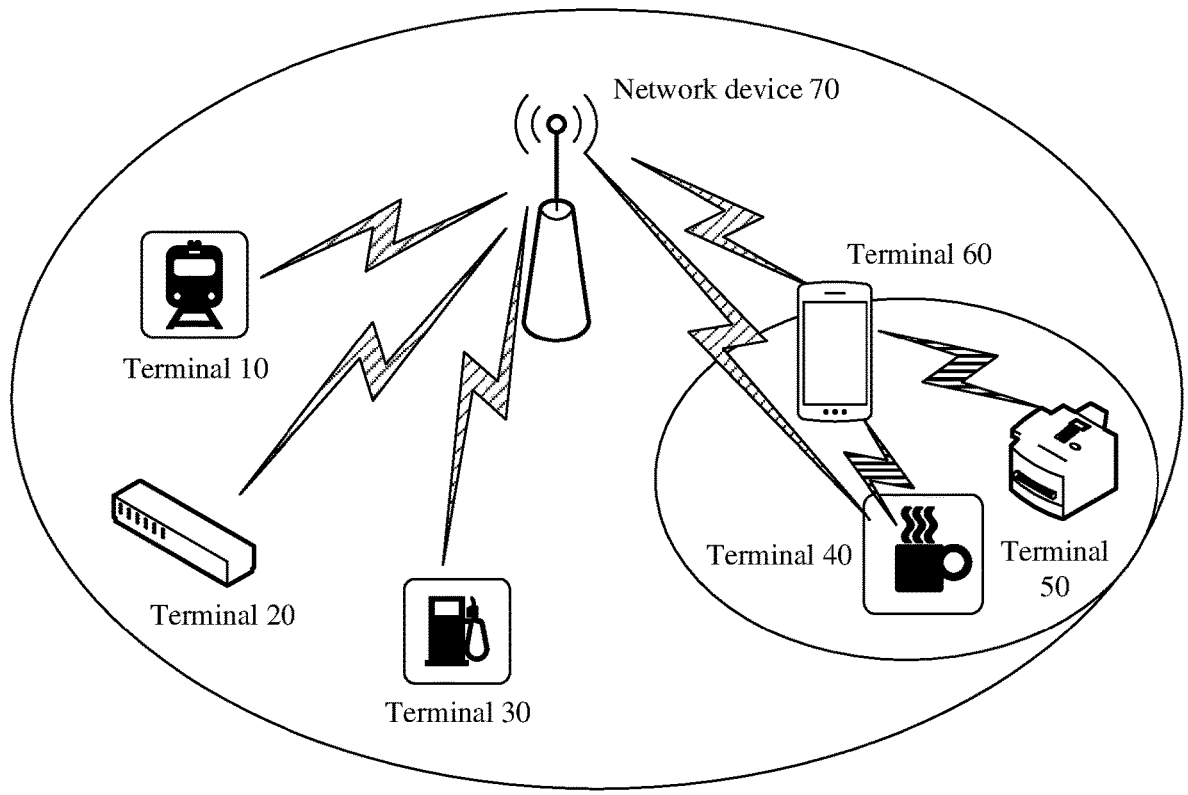
FIG. 1 is a schematic diagram of a communications system according to this application.

The following describes technical solutions of this application with reference to the accompanying drawings.

The technical solutions in embodiments of this application may be applied to various communications system, for example, a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communications system, a future 5th generation (5th generation, 5G) system, or a new radio (new radio, NR) system.

A terminal in embodiments of this application may be user equipment, an access terminal, a subscriber unit, a subscriber station, a mobile station, a remote station, a remote terminal, a mobile device, a user terminal, a terminal device, a wireless communications device, a user agent, or a user apparatus. The terminal may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communications function, a computing device, another processing device connected to a wireless modem, a vehicle-mounted device, a wearable device, a terminal in a future 5G network, a terminal in a future evolved public land mobile network (public land mobile network, PLMN), or the like. This is not limited in embodiments of this application.

A network device in embodiments of this application may be a device configured to communicate with a terminal. The network device may be a base transceiver station (base transceiver station, BTS) in the global system for mobile communications (global system for mobile communications, GSM) system or the code division multiple access (code division multiple access, CDMA) system, or may be a NodeB (NodeB, NB) in the wideband code division multiple access (wideband code division multiple access, WCDMA) system, or may be an evolved NodeB (evolved NodeB, eNB or eNodeB) in the LTE system, or may be a radio controller in a cloud radio access network (Cloud radio access network, CRAN) scenario, or the network device may be a relay station, an access point, a vehicle-mounted device, a wearable device, a network device in a future 5G network, a network device in a future evolved PLMN network, or an antenna panel or an antenna panel group (including a plurality of antenna panels) of a base station in a 5G system, or may be a network node that constitutes a 5G base station (gNB) or a transmission point, for example, a baseband unit (baseband unit, BBU) or a distributed unit (distributed unit, DU). This is not limited in embodiments of this application.

In some deployment, the gNB may include a centralized unit (centralized unit, CU) and the DU. The gNB may further include an active antenna unit (active antenna unit, AAU). The CU implements some functions of the gNB, and the DU implements some functions of the gNB. For example, the CU is responsible for processing a non-real-time protocol and service, to implement functions of radio resource control (radio resource control, RRC) and packet data convergence protocol (packet data convergence protocol, PDCP) layers. The DU is responsible for processing a physical layer protocol and a real-time service, to implement functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is converted from the information at the PHY layer. Therefore, in the architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in a radio access network (radio access network, RAN), or the CU may be classified as a network device in a core network (core network, CN). This is not limited in this application.

In embodiments of this application, the terminal or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the method provided in embodiments of this application may be performed by the terminal or the network device, or a functional module that can invoke and execute the program in the terminal or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

The following describes in detail terms in this application.

1. Random Access Preamble:

The random access preamble may be actual content that is sent by a terminal on a physical random access channel. The random access preamble is a ZC sequence. The ZC sequence preamble may be generated by using different cyclic shifts. Different ZC sequence preambles may be used for different users. In LTE and 5G NR systems, a cell usually has 64 different random access preambles.

2. Antenna Port:

The antenna port is a logical concept, and there is no direct correspondence between an antenna port and a physical antenna. The antenna port is usually associated with a reference signal, and may be specifically understood as a transceiver interface on a channel through which the reference signal passes. For a low frequency, one antenna port may correspond to one or more antenna array elements, and these array elements jointly send a reference signal. A receive end may consider received reference signals as a whole, without distinguishing the array elements from which the reference signals are sent. For a high frequency system, a plurality of antenna ports may correspond to one beam. Similarly, a receive end may only need to consider the beam as one interface, without distinguishing each array element.

3. Licensed Resource:

The licensed resource is usually a resource that can provide high communications quality, which is generally a time-frequency resource whose use needs to be approved by a national or local wireless committee. Different systems such as an LTE system and a Wi-Fi system, or systems of different operators cannot share a licensed time-frequency resource.

4. Unlicensed Resource:

The unlicensed resource may offload traffic for a licensed resource to obtain good coverage and capacity, thereby improving user experience. Specifically, the unlicensed resource may be a resource that may be shared by a plurality of communications devices. Sharing of the unlicensed resource means that for use of a particular spectrum, limitations are posed only on indicators such as transmit power and out-of-band emission, to ensure that a plurality of devices sharing the band meet a basic coexistence requirement. An operator may implement network traffic offloading by using an unlicensed resource, but needs to obey regulatory requirements of different regions and different spectrums on the unlicensed resource. These requirements are usually posed to protect a public system such as radar and ensure that a plurality of systems fairly coexist and causes negative impact to each other as little as possible, and include a transmit power limit, an out-of-band emission specification, indoor and outdoor use restrictions. Moreover, some regions further have some additional coexistence policies and the like. For example, communications devices may use a time-frequency resource in a contention manner or a listening manner, for example, a manner specified in listen before talk (listen before talk, LBT).

For example but not for limitation, in embodiments of the present invention, the unlicensed resource (specifically, an unlicensed resource) may include a band close to 5 GHz, a band close to 2.4 GHz, a band close to 3.5 GHz, and a band close to 6 GHz.

Moreover, for example but not for limitation, in embodiments of the present invention, a communications system may use, for example, a licensed-assisted access (licensed-assisted access, LAA) technology, a dual connectivity (dual connectivity, DC) technology, or a standalone (standalone) technology. LAA includes using a carrier aggregation (carrier aggregation, CA) configuration and structure in the existing LTE system, and on the basis of configuring a carrier (licensed carrier) in a licensed band of an operator for communication, configuring carriers (unlicensed carriers) on a plurality of unlicensed resources and performing communication by using an unlicensed carrier with assistance of the licensed carrier. That is, an LTE device may use, in a CA manner, the licensed carrier as a primary component carrier (primary component carrier, PCC) or a primary serving cell (primary cell, PCell), and the unlicensed carrier as a secondary component carrier (secondary component carrier, SCC) or a secondary serving cell (secondary cell, SCell). The dual connectivity DC technology includes a technology of jointly using a licensed carrier and an unlicensed carrier in a non-CA manner, or may further include a technology of jointly using a plurality of unlicensed carriers in a non-CA manner. The LTE device may alternatively be directly deployed on an unlicensed carrier through independent deployment.

It may be understood that, embodiments of this application may be applied to a licensed resource, and may also be applied to an unlicensed resource.

5. Bandwidth (Bandwidth):

The bandwidth may be understood as continuous or discontinuous resources in frequency domain. For example, the bandwidth may be a cell (cell), a carrier, or a bandwidth part (bandwidth part, BWP). The cell may be a serving cell of a terminal. The serving cell is described by a high layer from a perspective of a resource management, mobility management, or service unit. A coverage area of each network device may be divided into one or more serving cells, and the serving cell may be considered as including a specific frequency domain resource, that is, one serving cell may include one or more carriers. The concept of carrier is described from a perspective of signal generation at a physical layer. One carrier is defined by one or more frequencies, corresponds to continuous or discontinuous spectrums, and is configured to carry communications data between a network device and a terminal. A downlink carrier may be configured for downlink transmission, and an uplink carrier may be configured for uplink transmission. In addition, one carrier may include one or more bandwidth parts.

It should be noted that if one cell includes one carrier, one carrier may be considered as an independent cell without considering a physical location. That is, the carrier may be replaced with the cell equivalently.

It should be understood that the BWP may be referred to as a carrier bandwidth part (carrier bandwidth part), a subband (subband) bandwidth, a narrowband (narrowband) bandwidth, or another name. For ease of description, the following embodiments use the BWP as an example for description, but this is not limited in this application.

It should be noted that with continuous development of technologies, terms in embodiments of this application may change, but all of them fall within the protection scope of this application.

FIG. 1 is a schematic diagram of a communications system according to this application. The communications system in FIG. 1 may include at least one terminal (for example, a terminal 10, a terminal 20, a terminal 30, a terminal 40, a terminal 50, and a terminal 60) and a network device 70. The network device 70 is configured to provide a communications service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, and may receive uplink signals sent by the terminal 10, the terminal 20, the terminal 30, the terminal 40, and the terminal 60.

In addition, the terminal 40, the terminal 50, and the terminal 60 may also be considered as a communications system. The terminal 60 may send downlink signals to the terminal 40 and the terminal 50, or may receive uplink signals sent by the terminal 40 and the terminal 50.

It should be noted that embodiments of this application may be applied to a communications system including one or more network devices, and may also be applied to a communications system including one or more terminals. This is not limited in this application.

It should be understood that the communications system may include one or more network devices. One network device may send data or control signaling to one or more terminals. A plurality of network devices may simultaneously send data or control signaling to one or more terminals.

Figure 2:
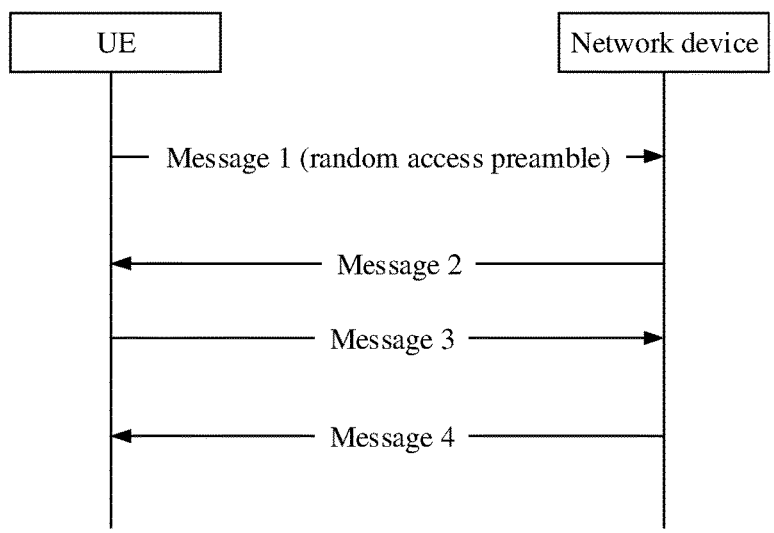
FIG. 2 is a schematic flowchart of a random access method in a conventional solution.

FIG. 2 is a schematic diagram of a random access process of a four-step random access type in a conventional solution. After selecting a proper cell to complete camping, a terminal may initiate random access. As shown in FIG. 2, UE sends a message 1 (message 1, msg 1) to a network device. The message 1 is a random access preamble (preamble). After detecting the random access preamble, the network device returns a response message, that is, a message 2 (message 2), to the UE. The message 2 includes an uplink resource allocated by the network device to the UE. After receiving the message 2, the UE sends a message 3 on the uplink resource indicated by the message 2. If the network device can correctly decode the message 3 (message 3), the network device returns a message 4 (message 4) to the UE. The message 4 is used to notify the UE of a success in contention. After the foregoing four steps, a random access procedure succeeds.

Figure 3:
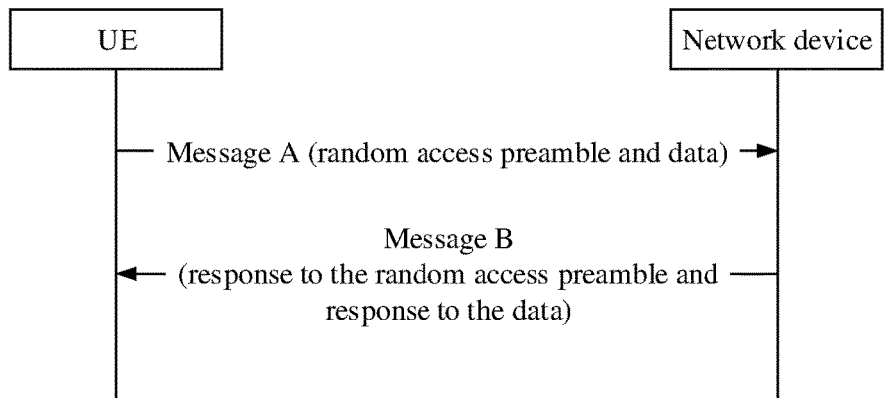
FIG. 3 is a schematic flowchart of another random access method in a conventional solution.

FIG. 3 is a schematic diagram of a random access process of a two-step random access type in a conventional solution. In the two-step random access process, UE adds both a random access preamble and data (preamble and data) to a message A. The data part is used for contention resolution, for example, a radio resource control (radio resource control, RRC) message. If there is no conflict between UEs, a network device returns a message B to the UE after successfully decoding the message A. The message B includes both a response to the random access preamble and a response to the data. The response to the random access preamble is a random access response (random access response, RAR). The response to the data is usually an RRC message. The two responses may be sent simultaneously or sequentially. The UE may independently decode the two responses. After receiving the message B, the UE learns that random access succeeds.

It may be understood that, if there is a conflict between UEs, the network device may not successfully decode the data in the message A. In this case, the network device does not send the message B to the UE. After sending the message A, the UE waits for a time window. If the UE does not receive the message B, the UE considers that random access fails.

In a conventional solution, a terminal may generate, based on a random access formula, a random access signal used for random access. For example, the random access formula is as follows:

$$S^{(p,\mu)}(t) = \sum_{k=0}^{L_{RA}} a_k^{(p,RA)} e^{j2\pi(k+Kk_1+\bar{k})\Delta f_{RA}(t-t_0)} \quad (1)$$

where $K=\Delta f/\Delta f_{RA}$, p is an antenna port index, μ is an index of a data subcarrier spacing, $L_{RA}$ is a random access preamble length, $a_k^{(p,RA)}$ is a $k^{th}$ value of a random access preamble, $t_0$ is a time domain location of the random access signal, $\Delta f_{RA}$ is a random access signal subcarrier spacing, K is a multiple of the data subcarrier spacing and the random access signal subcarrier spacing, $k_1$ is used to indicate a location of an RB occupied by the random access signal (or a physical random access channel) (the RB is determined based on the random access signal subcarrier spacing), $\bar{k}$ is a subcarrier quantity parameter, and the subcarrier quantity parameter is used to indicate a guard interval between the random access signal and a data signal.

It may be understood that the subcarrier spacing may be understood as a width of a subcarrier. For example, the data subcarrier spacing is a width of a data subcarrier, or a width of a subcarrier spacing of an initial uplink access bandwidth part, or a width of a subcarrier spacing of an initial downlink access bandwidth part, or a width of a subcarrier spacing corresponding to an uplink bandwidth part in which the physical random access channel is located. The random access signal subcarrier spacing is a width of a random access signal subcarrier. The random access signal subcarrier spacing is also referred to as a subcarrier spacing for random access preambles (subcarrier spacing for random access preambles). In the following embodiment, the data subcarrier spacing is described by using a subcarrier spacing of a physical uplink shared channel (physical uplink shared channel, PUSCH) as an example, and the random access signal subcarrier spacing is described by using a subcarrier spacing of a physical random access channel (physical random access channel, PRACH) (subcarrier spacing of PRACH) as an example.

Generally, a granularity of $k_1$ is generally a quantity of subcarriers in one RB. For example, if the quantity of subcarriers in one RB is 12, the granularity of $k_1$ is 12. That is, a value of $k_1$ is a multiple of 12. It may be further understood that the granularity of $k_1$ may be an integer quantity of subcarriers or a fractional quantity of RBs. For example, the granularity of $k_1$ is ½ of a quantity of subcarriers in one RB. For example, if the quantity of subcarriers in one RB is 12, the granularity of $k_1$ is 6. That is, a value of $k_1$ is a multiple of 6.

In a conventional communications system, a length of a random access preamble is generally not a quantity of subcarriers corresponding to an integer quantity of RBs, while a physical random access channel is generally a quantity of subcarriers corresponding to an integer quantity of RBs. Therefore, when the random access preamble is modulated at a frequency location of the random access channel, some subcarriers on a bandwidth occupied by the random access channel are not mapped. The subcarriers to which the random access preamble is not mapped may function as a guard interval, that is, protect a signal carried on the random access channel or another signal nearby that is mapped to a location of an integer quantity of RBs, to prevent interference caused by non-ideality (for example, a frequency offset) in an actual system from reducing system performance. $\bar{k}$ may be used to adjust a location of the guard interval, that is, adjust a location of a subcarrier to which the random access preamble is mapped on the PRACH (or a location of a subcarrier occupied by a random access signal corresponding to the random access preamble).

It may be further understood that the random access preamble length and the random access signal subcarrier spacing determine a size of a frequency resource actually used by the random access signal. The data subcarrier spacing and a quantity of RBs occupied by the random access signal determine a size of a frequency resource occupied by the random access signal. It is clear that the size of the frequency resource occupied by the random access signal is greater than or equal to the size of the frequency resource actually used by the random access signal.

Figure 4:
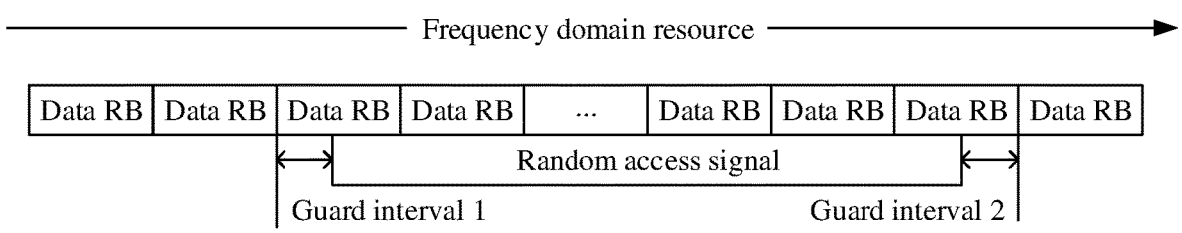
FIG. 4 is a schematic diagram of a frequency domain resource structure according to an embodiment of this application.

As shown in FIG. 4, the guard interval of the random access signal may include two guard intervals: a guard interval 1 and a guard interval 2. $\bar{k}$ may be used to adjust respective sizes of the two guard intervals shown in FIG. 4. The terminal may obtain a parameter in formula (1) other than the subcarrier quantity parameter ($\bar{k}$). Therefore, how to determine $\bar{k}$ needs to be resolved urgently.

Figure 5:
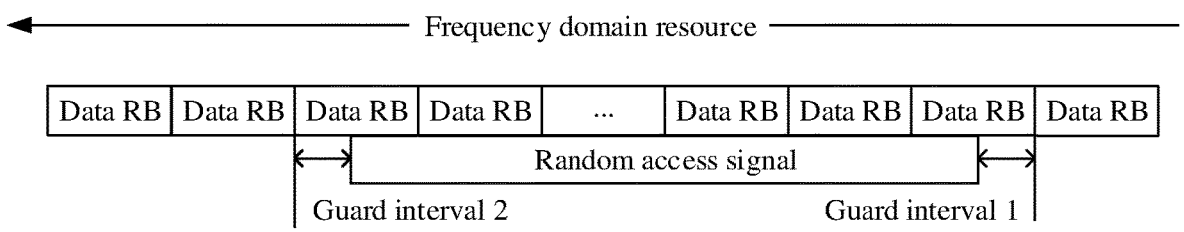
FIG. 5 is a schematic diagram of a frequency domain resource structure according to another embodiment of this application.

It may be understood that a left-to-right frequency domain direction shown in FIG. 4 is a frequency domain increasing direction. Therefore, if the left-to-right frequency domain direction is a frequency domain decreasing direction, the guard interval 1 and the guard interval 2 may be shown in FIG. 5.

Figure 6:
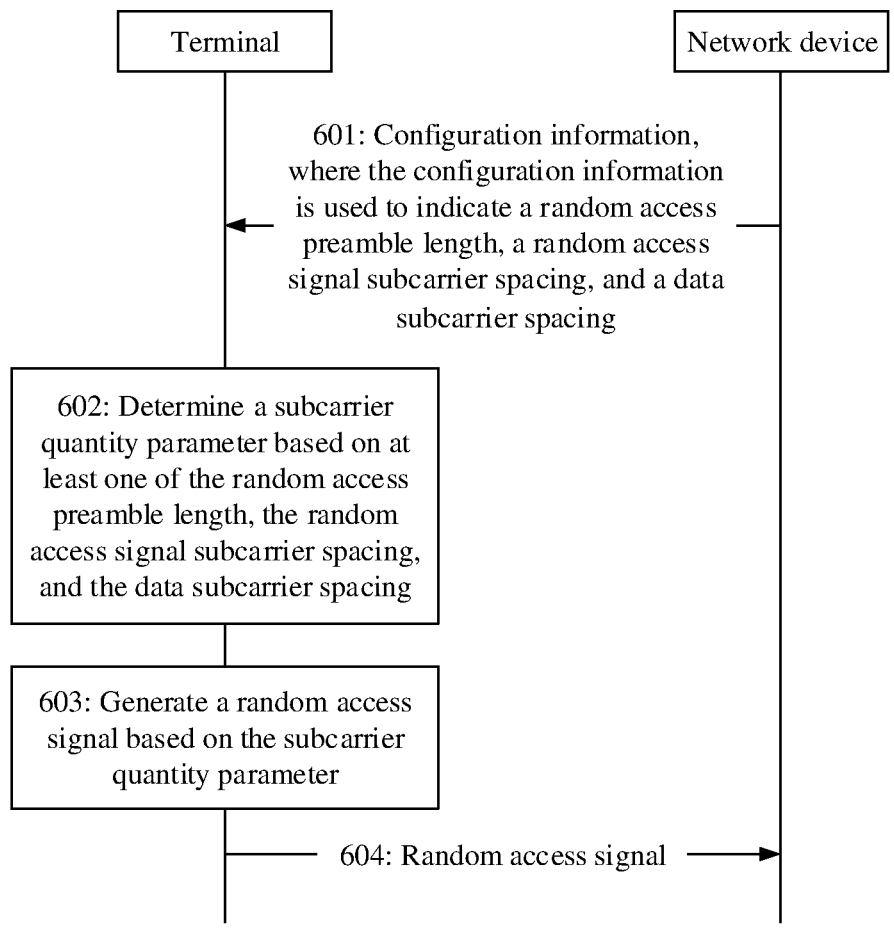
FIG. 6 is a schematic flowchart of a method for transmitting a random access signal according to an embodiment of this application.

FIG. 6 is a schematic flowchart of a method for transmitting a random access signal according to an embodiment of this application.

It should be understood that the embodiment shown in FIG. 6 may be executed by a terminal, or may be a chip in the terminal. This is not limited in this application. For ease of description, the following uses the terminal as an example for description. However, this application is not limited thereto.

601. The terminal receives configuration information, where the configuration information is used to indicate a random access preamble length, a random access signal subcarrier spacing, and a data subcarrier spacing.

Specifically, the terminal may receive the configuration information from a network device. Correspondingly, the network device may send the configuration information to the terminal. The configuration information may be used to indicate at least one of the random access preamble length, the random access signal subcarrier spacing, and the data subcarrier spacing.

It may be understood that, the configuration information may directly indicate the random access preamble length. For example, the configuration information includes the random access preamble length. Alternatively, the configuration information may indirectly indicate the random access preamble length. For example, the configuration information includes a physical random access channel configuration index. That is, the terminal may obtain a random access preamble format based on the physical random access channel configuration index, and correspondingly obtain the random access preamble length. Correspondingly, the configuration information may also directly or indirectly indicate the random access signal subcarrier spacing or the data subcarrier spacing. For example, the configuration information may further include a subcarrier spacing for random access preambles and/or a subcarrier spacing of an initial uplink bandwidth part. The subcarrier spacing of the initial uplink bandwidth part is the data subcarrier spacing.

Optionally, the random access preamble length may be any one of 139, 839, 571, or 1151. That is, this application can expand an application range of random access.

Optionally, the random access signal subcarrier spacing may be any one of 1.25 KHz, 5 KHz, 15 KHz, 30 KHz, 60 KHz, 120 KHz, 240 KHz, 480 KHz, 960 KHz, 1920 KHz, and 3840 KHz.

Optionally, the data subcarrier spacing may also be any one of 1.25 KHz, 5 KHz, 15 KHz, 30 KHz, 60 KHz, 120 KHz, 240 KHz, 480 KHz, 960 KHz, 1920 KHz, and 3840 KHz.

It may be understood that a random access signal subcarrier spacing less than 240 KHz (for example, 1.25 KHz, 5 KHz, 15 KHz, 30 KHz, 60 KHz, or 120 KHz) corresponds to a scenario of a carrier frequency band less than 52.6 GHz. A random access signal subcarrier spacing greater than or equal to 240 KHz corresponds to a scenario of a carrier frequency band greater than or equal to 52.6 GHz.

Optionally, a data subcarrier spacing less than 240 KHz (for example, 15 KHz, 30 KHz, 60 KHz, or 120 KHz) corresponds to a scenario of a carrier frequency band less than 52.6 GHz. A data subcarrier spacing greater than or equal to 240 KHz corresponds to a scenario of a carrier frequency band greater than or equal to 52.6 GHz.

602. The terminal determines a subcarrier quantity parameter based on at least one of the random access preamble length, the random access signal subcarrier spacing, and the data subcarrier spacing, where the subcarrier quantity parameter includes a first subcarrier quantity used to indicate a frequency resource start location of a random access preamble and a frequency resource start location of a physical random access channel, and/or a second subcarrier quantity used to indicate a frequency resource end location of the random access preamble and a frequency resource end location of the physical random access channel.

Specifically, the terminal may determine the subcarrier quantity parameter with reference to at least one of the random access preamble length, the random access signal subcarrier spacing, and the data subcarrier spacing. In this way, the terminal can be helped to generate an accurate random access signal, thereby helping improve random access efficiency.

For example, the terminal may store a mapping relationship of at least one of the random access preamble length, the random access signal subcarrier spacing, and the data subcarrier spacing with the subcarrier quantity parameter. The mapping relationship may be implemented by using a formula, or may be implemented by using a table. This is not limited in this application.

It may be understood that, the frequency resource start location of the random access preamble is a start location that is on a subcarrier corresponding to the physical random access channel and from which the random access preamble is mapped, and the frequency resource end location of the random access preamble is a last location that is on the subcarrier corresponding to the physical random access channel and at which the random access preamble is mapped. The subcarrier quantity parameter includes the first subcarrier quantity used to indicate the frequency resource start location of the random access preamble and the frequency resource start location of the physical random access channel, that is, the guard interval 1 shown in FIG. 4 or FIG. 5. The subcarrier quantity parameter may further include the second subcarrier quantity used to indicate the frequency resource end location of the random access preamble and the frequency resource end location of the physical random access channel, that is, the guard interval 2 shown in FIG. 4 or FIG. 5.

It should be noted that, the subcarrier quantity parameter may include only the first subcarrier quantity, or may include only the second subcarrier quantity, or may include the first subcarrier quantity and the second subcarrier quantity. When the subcarrier quantity parameter includes only the first subcarrier quantity or the second subcarrier quantity, the terminal may derive the other subcarrier quantity with reference to a total subcarrier quantity (which may also be referred to as a "total subcarrier quantity width" in the following embodiment). For example, the subcarrier quantity includes the first subcarrier quantity, and the terminal may obtain the second subcarrier quantity by subtracting the first subcarrier quantity from the total subcarrier quantity.

It may be further understood that the frequency resource may also be referred to as a "frequency domain resource", which are not distinguished in the following embodiment.

In an embodiment, step 602 may be specifically as follows: The terminal first determines a total subcarrier quantity frequency domain width based on the random access preamble length, the random access signal subcarrier spacing, and the data subcarrier spacing in the configuration information, and then determines the subcarrier quantity parameter based on the total subcarrier quantity frequency domain width, the random access signal subcarrier spacing, and the data subcarrier spacing.

Specifically, the total subcarrier quantity frequency domain width may be a total frequency domain width occupied by the guard interval 1 and the guard interval 2 that are shown in FIG. 4. That is, the terminal may first determine the total subcarrier quantity frequency domain width, and then further determine the subcarrier quantity parameter. In other words, the terminal may indirectly obtain the subcarrier quantity parameter.

Optionally, that the terminal determines a total subcarrier quantity frequency domain width based on the random access preamble length, the random access signal subcarrier spacing, and the data subcarrier spacing may be specifically as follows:

$$GP = N_{RB}^{RA} * (\Delta f * N) - L_{RA} * \Delta f_{RA} \tag{2}$$

where GP represents the total subcarrier quantity frequency domain width, $\Delta f$ represents the data subcarrier spacing, $\Delta f_{RA}$ represents the random access signal subcarrier spacing, $N_{RB}^{RA}$ represents a total quantity of frequency domain resource blocks allocated to a random access signal, N represents a quantity of subcarriers in one RB, and $L_{RA}$ represents the random access preamble length. * represents multiplication, and may also be denoted as x.

It may be understood that, in NR, a quantity of subcarriers in one RB may be 12. In the following embodiment, N=12 is used as an example for description. However, this application is not limited thereto.

It may be understood that $N_{RB}^{RA}$ may be known, or may be determined by using the following formula (3), which is not limited in this application:

$$N_{RB}^{RA} = \text{ceil}(L_{RA} * \Delta f_{RA} / (\Delta f * N)) \tag{3}$$

where $L_{RA}$ represents the random access preamble length, $N_{RB}^{RA}$ represents the total quantity of frequency domain resource blocks allocated to the random access signal, N represents the quantity of subcarriers in one RB, $\Delta f$ represents the data subcarrier spacing, $\Delta f_{RA}$ represents the random access signal subcarrier spacing, and ceil represents rounding up.

For example, if N=12, $L_{RA}$=139, $\Delta f_{RA}$=240 KHz, and $\Delta f$=60 KHz, $N_{RB}^{RA}$=ceil(139*240/(60*12))=47, that is, one random access signal occupies 47 RBs in frequency domain.

Correspondingly, GP=47*(60*12)−139*240=480 KHz may be obtained based on formula (2).

It may be further understood that, the terminal may alternatively directly determine the subcarrier quantity parameter based on the random access preamble length, the random access signal subcarrier spacing, and the data subcarrier spacing, for example, by using the following formula (4), that is, the terminal does not need to learn the intermediate parameter $N_{RB}^{RA}$:

$$GP = \text{ceil}(L_{RA} * \Delta f_{RA} / (\Delta f * N)) * (\Delta f * N) - L_{RA} * \Delta f_{RA} \tag{4}$$

where GP represents the total subcarrier quantity frequency domain width, $L_{RA}$ represents the random access preamble length, $N_{RB}^{RA}$ represents the total quantity of frequency domain resource blocks allocated to the random access signal, N represents the quantity of subcarriers in one RB, $\Delta f$ represents the data subcarrier spacing, $\Delta f_{RA}$ represents the random access signal subcarrier spacing, and ceil represents rounding up.

Optionally, the first subcarrier quantity and the second subcarrier quantity are the same.

Specifically, the guard interval 1 and the guard interval 2 may be the same, so that the terminal may implement same impact on data demodulation at two ends of the random access signal, thereby reducing complexity of the terminal.

Optionally, when the first subcarrier quantity and the second subcarrier quantity are the same, the total subcarrier quantity frequency domain width, the random access signal subcarrier spacing, the data subcarrier spacing, and the subcarrier quantity parameter meet the following relationship:

$$\overline{k} = \frac{\left(\frac{GP}{2} - \frac{\Delta f}{2}\right)}{\Delta f_{RA}} + 0.5 \tag{5}$$

where GP represents the total subcarrier quantity frequency domain width, $\Delta f$ represents the data subcarrier spacing, $\Delta f_{RA}$ represents the random access signal subcarrier spacing, and $\overline{k}$ represents the subcarrier quantity parameter.

Figure 7:
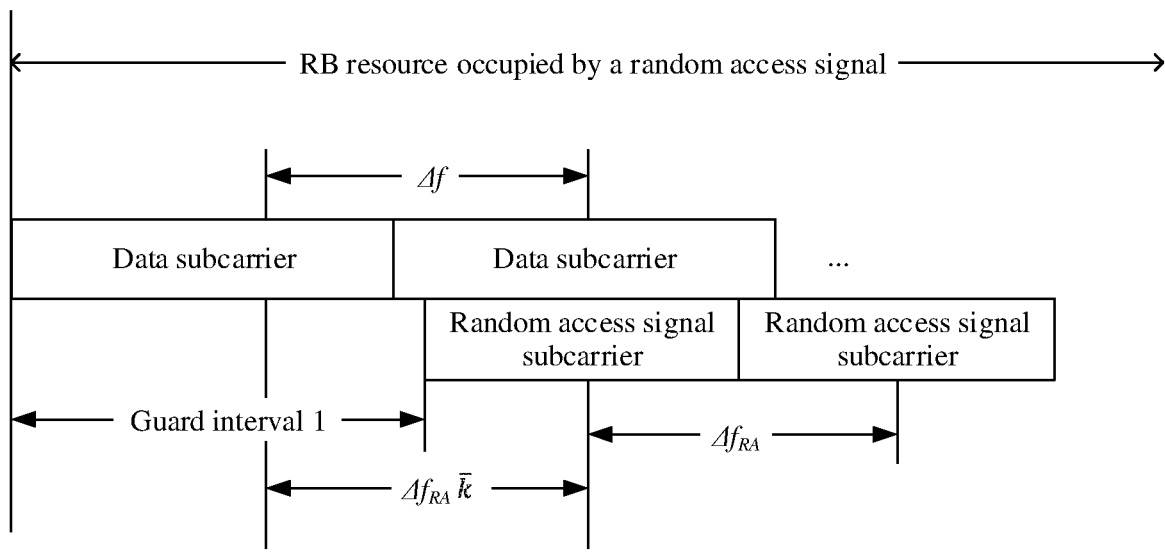
FIG. 7 is a schematic diagram of a frequency domain resource structure according to an embodiment of this application.

Specifically, as shown in FIG. 7, that the guard interval 1 and the guard interval are the same means that the guard interval 1 or the guard interval 2 is GP/2, and GP/2 meets the following relationship:

$$GP/2 = GP/2 = \Delta f_{RA} \overline{k} - \Delta f_{RA}/2 + \Delta f/2 \tag{6}$$

In this way, formula (5) may be derived from formula (6).

It may be understood that any transformation performed on formula (5) falls within the protection scope of this application.

Optionally, the terminal may store the following table (Table 1). For example, the random access preamble length may be 139, and a value of $\overline{k}$ may be shown in the following Table 1. In this way, when learning $L_{RA}$, $\Delta f$, and $\Delta f_{RA}$, the terminal may obtain the value of $\overline{k}$ by searching the table.

TABLE 1

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 139 | 240 | 60 | 47 | 1.375 | 1 | 2 | 1 |
| 139 | 480 | 60 | 93 | 0.6875 | 1 | 1 | 0 |
| 139 | 960 | 60 | 186 | 0.71875 | 1 | 1 | 0 |
| 139 | 1920 | 60 | 371 | 0.546875 | 1 | 1 | 0 |
| 139 | 3840 | 60 | 742 | 0.554688 | 1 | 1 | 0 |
| 139 | 240 | 120 | 24 | 2.75 | 3 | 3 | 2 |
| 139 | 480 | 120 | 47 | 1.375 | 1 | 2 | 1 |
| 139 | 960 | 120 | 93 | 0.6875 | 1 | 1 | 0 |
| 139 | 1920 | 120 | 186 | 0.71875 | 1 | 1 | 0 |
| 139 | 3840 | 120 | 371 | 0.546875 | 1 | 1 | 0 |
| 139 | 120 | 240 | 6 | 2 | 2 | 2 | 2 |
| 139 | 240 | 240 | 12 | 2.5 | 3 | 3 | 2 |
| 139 | 480 | 240 | 24 | 2.75 | 3 | 3 | 2 |
| 139 | 960 | 240 | 47 | 1.375 | 1 | 2 | 1 |
| 139 | 1920 | 240 | 93 | 0.6875 | 1 | 1 | 0 |
| 139 | 3840 | 240 | 186 | 0.71875 | 1 | 1 | 0 |
| 139 | 120 | 480 | 3 | 1 | 1 | 1 | 1 |
| 139 | 240 | 480 | 6 | 2 | 2 | 2 | 2 |
| 139 | 480 | 480 | 12 | 2.5 | 3 | 3 | 2 |
| 139 | 960 | 480 | 24 | 2.75 | 3 | 3 | 2 |
| 139 | 1920 | 480 | 47 | 1.375 | 1 | 2 | 1 |
| 139 | 3840 | 480 | 93 | 0.6875 | 1 | 1 | 0 |
| 139 | 120 | 960 | 2 | 23 | 23 | 23 | 23 |
| 139 | 240 | 960 | 3 | 1 | 1 | 1 | 1 |
| 139 | 480 | 960 | 6 | 2 | 2 | 2 | 2 |
| 139 | 960 | 960 | 12 | 2.5 | 3 | 3 | 2 |
| 139 | 1920 | 960 | 24 | 2.75 | 3 | 3 | 2 |
| 139 | 3840 | 960 | 47 | 1.375 | 1 | 2 | 1 |
| 139 | 120 | 1920 | 1 | 19 | 19 | 19 | 19 |
| 139 | 240 | 1920 | 2 | 23 | 23 | 23 | 23 |
| 139 | 480 | 1920 | 3 | 1 | 1 | 1 | 1 |
| 139 | 960 | 1920 | 6 | 2 | 2 | 2 | 2 |
| 139 | 1920 | 1920 | 12 | 2.5 | 3 | 3 | 2 |
| 139 | 3840 | 1920 | 24 | 2.75 | 3 | 3 | 2 |
| 139 | 120 | 3840 | 1 | 107 | 107 | 107 | 107 |
| 139 | 240 | 3840 | 1 | 19 | 19 | 19 | 19 |
| 139 | 480 | 3840 | 2 | 23 | 23 | 23 | 23 |
| 139 | 960 | 3840 | 3 | 1 | 1 | 1 | 1 |
| 139 | 1920 | 3840 | 6 | 2 | 2 | 2 | 2 |
| 139 | 3840 | 3840 | 12 | 2.5 | 3 | 3 | 2 |

It may be understood that $\bar{k}$ in Table 1 may be calculated by using formula (5). The terminal may learn a calculation manner of formula (5) to obtain Table 1, or may only store Table 1. This is not limited in this application.

It may be understood that when the value of $\bar{k}$ is an integer, complexity of sending a signal by the terminal may be reduced. Therefore, in this embodiment of this application, rounding (Round) (approximating to the nearest integer), ceiling (rounding up), or flooring (rounding down) may be performed on $\bar{k}$ in Table 1, to obtain an integer as $\bar{k}$. For example, as shown in the following Table 2, flooring on $\bar{k}$ is used as an example for description.

TABLE 2

| $L_{RA}$ | $\Delta f_{RA}$ | $\Delta f$ | $N_{RB}^{RA}$ | $\bar{k}$ |
|---|---|---|---|---|
| 139 | 240 | 60 | 41 | 1 |
| 139 | 480 | 60 | 93 | 0 |
| 139 | 960 | 60 | 186 | 0 |
| 139 | 1920 | 60 | 371 | 0 |
| 139 | 3840 | 60 | 742 | 0 |
| 139 | 240 | 120 | 24 | 2 |
| 139 | 480 | 120 | 47 | 1 |
| 139 | 960 | 120 | 93 | 0 |
| 139 | 1920 | 120 | 186 | 0 |
| 139 | 3840 | 120 | 371 | 0 |
| 139 | 120 | 240 | 6 | 2 |
| 139 | 240 | 240 | 12 | 2 |
| 139 | 480 | 240 | 24 | 2 |
| 139 | 960 | 240 | 47 | 1 |
| 139 | 1920 | 240 | 93 | 0 |
| 139 | 3840 | 240 | 186 | 0 |

TABLE 2-continued

| $L_{RA}$ | $\Delta f_{RA}$ | $\Delta f$ | $N_{RB}^{RA}$ | $\bar{k}$ |
|---|---|---|---|---|
| 139 | 120 | 480 | 3 | 1 |
| 139 | 240 | 480 | 6 | 2 |
| 139 | 480 | 480 | 12 | 2 |
| 139 | 960 | 480 | 24 | 2 |
| 139 | 1920 | 480 | 47 | 1 |
| 139 | 3840 | 480 | 93 | 0 |
| 139 | 120 | 960 | 2 | 23 |
| 139 | 240 | 960 | 3 | 1 |
| 139 | 480 | 960 | 6 | 2 |
| 139 | 960 | 960 | 12 | 2 |
| 139 | 1920 | 960 | 24 | 2 |
| 139 | 3840 | 960 | 47 | 1 |
| 139 | 120 | 1920 | 1 | 19 |
| 139 | 240 | 1920 | 2 | 23 |
| 139 | 480 | 1920 | 3 | 1 |
| 139 | 960 | 1920 | 6 | 2 |
| 139 | 1920 | 1920 | 12 | 2 |
| 139 | 3840 | 1920 | 24 | 2 |
| 139 | 120 | 3840 | 1 | 107 |
| 139 | 240 | 3840 | 1 | 19 |
| 139 | 480 | 3840 | 2 | 23 |
| 139 | 960 | 3840 | 3 | 1 |
| 139 | 1920 | 3840 | 6 | 2 |
| 139 | 3840 | 3840 | 12 | 2 |

It may be further understood that Table 1 may be further simplified into the following Table 3.

TABLE 3

| $L_{RA}$ | $\Delta f_{RA}$ | $\Delta f$ | $\bar{k}$ |
|---|---|---|---|
| 139 | 240 | 60 | 1 |
| 139 | 480 | 60 | 0 |
| 139 | 960 | 60 | 0 |
| 139 | 1920 | 60 | 0 |
| 139 | 3840 | 60 | 0 |
| 139 | 240 | 120 | 2 |
| 139 | 480 | 120 | 1 |
| 139 | 960 | 120 | 0 |
| 139 | 1920 | 120 | 0 |
| 139 | 3840 | 120 | 0 |
| 139 | 120 | 240 | 2 |
| 139 | 240 | 240 | 2 |
| 139 | 480 | 240 | 2 |
| 139 | 960 | 240 | 1 |
| 139 | 1920 | 240 | 0 |
| 139 | 3840 | 240 | 0 |
| 139 | 120 | 480 | 1 |
| 139 | 240 | 480 | 2 |
| 139 | 480 | 480 | 2 |
| 139 | 960 | 480 | 2 |
| 139 | 1920 | 480 | 1 |
| 139 | 3840 | 480 | 0 |
| 139 | 120 | 960 | 23 |
| 139 | 240 | 960 | 1 |
| 139 | 480 | 960 | 2 |
| 139 | 960 | 960 | 2 |
| 139 | 1920 | 960 | 2 |
| 139 | 3840 | 960 | 1 |
| 139 | 120 | 1920 | 19 |
| 139 | 240 | 1920 | 23 |
| 139 | 480 | 1920 | 1 |
| 139 | 960 | 1920 | 2 |
| 139 | 1920 | 1920 | 2 |
| 139 | 3840 | 1920 | 2 |
| 139 | 120 | 3840 | 107 |
| 139 | 240 | 3840 | 19 |
| 139 | 480 | 3840 | 23 |
| 139 | 960 | 3840 | 1 |
| 139 | 1920 | 3840 | 2 |
| 139 | 3840 | 3840 | 2 |

It may be further understood that, the terminal may alternatively store only correspondences of $\Delta f_{RA}=\Delta f$, or may store only correspondences of $\Delta f_{RA}<\Delta f$. This is not limited in this application.

Optionally, the terminal may store the following table (Table 4). For example, the random access preamble length may be 571, and a value of $\bar{k}$ may be shown in the following Table 4.

TABLE 4

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 571 | 240 | 60 | 191 | 1.375 | 1 | 2 | 1 |
| 571 | 480 | 60 | 381 | 0.6875 | 1 | 1 | 0 |
| 571 | 960 | 60 | 762 | 0.71875 | 1 | 1 | 0 |
| 571 | 1920 | 60 | 1523 | 0.546875 | 1 | 1 | 0 |
| 571 | 3840 | 60 | 3046 | 0.554688 | 1 | 1 | 0 |
| 571 | 240 | 120 | 96 | 2.75 | 3 | 3 | 2 |
| 571 | 480 | 120 | 191 | 1.375 | 1 | 2 | 1 |
| 571 | 960 | 120 | 381 | 0.6875 | 1 | 1 | 0 |
| 571 | 1920 | 120 | 762 | 0.71875 | 1 | 1 | 0 |
| 571 | 3840 | 120 | 1523 | 0.546875 | 1 | 1 | 0 |
| 571 | 120 | 240 | 24 | 2 | 2 | 2 | 2 |
| 571 | 240 | 240 | 48 | 2.5 | 3 | 3 | 2 |
| 571 | 480 | 240 | 96 | 2.75 | 3 | 3 | 2 |
| 571 | 960 | 240 | 191 | 1.375 | 1 | 2 | 1 |
| 571 | 1920 | 240 | 381 | 0.6875 | 1 | 1 | 0 |
| 571 | 3840 | 240 | 762 | 0.71875 | 1 | 1 | 0 |
| 571 | 120 | 480 | 12 | 1 | 1 | 1 | 1 |
| 571 | 240 | 480 | 24 | 2 | 2 | 2 | 2 |
| 571 | 480 | 480 | 48 | 2.5 | 3 | 3 | 2 |
| 571 | 960 | 480 | 96 | 2.75 | 3 | 3 | 2 |
| 571 | 1920 | 480 | 191 | 1.375 | 1 | 2 | 1 |
| 571 | 3840 | 480 | 381 | 0.6875 | 1 | 1 | 0 |
| 571 | 120 | 960 | 6 | −1 | −1 | −1 | −1 |
| 571 | 240 | 960 | 12 | 1 | 1 | 1 | 1 |
| 571 | 480 | 960 | 24 | 2 | 2 | 2 | 2 |
| 571 | 960 | 960 | 48 | 2.5 | 3 | 3 | 2 |
| 571 | 1920 | 960 | 96 | 2.75 | 3 | 3 | 2 |
| 571 | 3840 | 960 | 191 | 1.375 | 1 | 2 | 1 |
| 571 | 120 | 1920 | 3 | −5 | −5 | −5 | −5 |
| 571 | 240 | 1920 | 6 | −1 | −1 | −1 | −1 |
| 571 | 480 | 1920 | 12 | 1 | 1 | 1 | 1 |
| 571 | 960 | 1920 | 24 | 2 | 2 | 2 | 2 |
| 571 | 1920 | 1920 | 48 | 2.5 | 3 | 3 | 2 |
| 571 | 3840 | 1920 | 96 | 2.75 | 3 | 3 | 2 |
| 571 | 120 | 3840 | 2 | 83 | 83 | 83 | 83 |
| 571 | 240 | 3840 | 3 | −5 | −5 | −5 | −5 |
| 571 | 480 | 3840 | 6 | −1 | −1 | −1 | −1 |
| 571 | 960 | 3840 | 12 | 1 | 1 | 1 | 1 |
| 571 | 1920 | 3840 | 24 | 2 | 2 | 2 | 2 |
| 571 | 3840 | 3840 | 48 | 2.5 | 3 | 3 | 2 |

It may be understood that, for correspondences of $L_{RA}=571$ stored in the terminal, refer to transformations shown in Table 1 to Table 2 or Table 3 and other transformations of Table 1. This is not limited in this application.

Optionally, the terminal may store the following table (Table 5). For example, the random access preamble length may be 1151, and a value of $\bar{k}$ may be shown in the following Table 5.

TABLE 5

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 1151 | 240 | 60 | 384 | 0.875 | 1 | 1 | 0 |
| 1151 | 480 | 60 | 768 | 0.9375 | 1 | 1 | 0 |
| 1151 | 960 | 60 | 1535 | 0.59375 | 1 | 1 | 0 |
| 1151 | 1920 | 60 | 3070 | 0.609375 | 1 | 1 | 0 |
| 1151 | 3840 | 60 | 6139 | 0.523438 | 1 | 1 | 0 |
| 1151 | 240 | 120 | 192 | 0.75 | 1 | 1 | 0 |
| 1151 | 480 | 120 | 384 | 0.875 | 1 | 1 | 0 |
| 1151 | 960 | 120 | 768 | 0.9375 | 1 | 1 | 0 |
| 1151 | 1920 | 120 | 1535 | 0.59375 | 1 | 1 | 0 |

TABLE 5-continued

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 1151 | 3840 | 120 | 3070 | 0.609375 | 1 | 1 | 0 |
| 1151 | 120 | 240 | 48 | 0 | 0 | 0 | 0 |
| 1151 | 240 | 240 | 96 | 0.5 | 1 | 1 | 0 |
| 1151 | 480 | 240 | 192 | 0.75 | 1 | 1 | 0 |
| 1151 | 960 | 240 | 384 | 0.875 | 1 | 1 | 0 |
| 1151 | 1920 | 240 | 768 | 0.9375 | 1 | 1 | 0 |
| 1151 | 3840 | 240 | 1535 | 0.59375 | 1 | 1 | 0 |
| 1151 | 120 | 480 | 24 | −1 | −1 | −1 | −1 |
| 1151 | 240 | 480 | 48 | 0 | 0 | 0 | 0 |
| 1151 | 480 | 480 | 96 | 0.5 | 1 | 1 | 0 |
| 1151 | 960 | 480 | 192 | 0.75 | 1 | 1 | 0 |
| 1151 | 1920 | 480 | 384 | 0.875 | 1 | 1 | 0 |
| 1151 | 3840 | 480 | 768 | 0.9375 | 1 | 1 | 0 |
| 1151 | 120 | 960 | 12 | −3 | −3 | −3 | −3 |
| 1151 | 240 | 960 | 24 | −1 | −1 | −1 | −1 |
| 1151 | 480 | 960 | 48 | 0 | 0 | 0 | 0 |
| 1151 | 960 | 960 | 96 | 0.5 | 1 | 1 | 0 |
| 1151 | 1920 | 960 | 192 | 0.75 | 1 | 1 | 0 |
| 1151 | 3840 | 960 | 384 | 0.875 | 1 | 1 | 0 |
| 1151 | 120 | 1920 | 6 | −7 | −7 | −7 | −7 |
| 1151 | 240 | 1920 | 12 | −3 | −3 | −3 | −3 |
| 1151 | 480 | 1920 | 24 | −1 | −1 | −1 | −1 |
| 1151 | 960 | 1920 | 48 | 0 | 0 | 0 | 0 |
| 1151 | 1920 | 1920 | 96 | 0.5 | 1 | 1 | 0 |
| 1151 | 3840 | 1920 | 192 | 0.75 | 1 | 1 | 0 |
| 1151 | 120 | 3840 | 3 | −15 | −15 | −15 | −15 |
| 1151 | 240 | 3840 | 6 | −7 | −7 | −7 | −7 |
| 1151 | 480 | 3840 | 12 | −3 | −3 | −3 | −3 |
| 1151 | 960 | 3840 | 24 | −1 | −1 | −1 | −1 |
| 1151 | 1920 | 3840 | 48 | 0 | 0 | 0 | 0 |
| 1151 | 3840 | 3840 | 96 | 0.5 | 1 | 1 | 0 |

It may be understood that, the terminal may alternatively store correspondences for a plurality of $L_{RA}$. For example, the terminal may store a table that includes all content shown in Table 1, Table 4, and Table 5. This is not limited in this application.

In addition, the terminal may alternatively store only correspondences for $\Delta f_{RA}=\Delta f$ in the plurality of $L_{RA}$, for example, as shown in Table 6 (using an example in which the value of $\bar{k}$ is rounded) and Table 7 (using an example in which the value of $\bar{k}$ is floored). Alternatively, the terminal stores only correspondences for $\Delta f_{RA}<\Delta f$ in the plurality of $L_{RA}$, for example, as shown in Table 8 (using an example in which the value of $\bar{k}$ is rounded).

TABLE 6

| $L_{RA}$ | $\Delta f_{RA}$ | $\Delta f$ | $\bar{k}$ |
|---|---|---|---|
| 139 | 240 | 240 | 3 |
| 139 | 480 | 480 | 3 |
| 139 | 960 | 960 | 3 |
| 139 | 1920 | 1920 | 3 |
| 139 | 3840 | 3840 | 3 |
| 571 | 240 | 240 | 3 |
| 571 | 960 | 960 | 3 |
| 571 | 1920 | 1920 | 3 |
| 571 | 3840 | 3840 | 3 |
| 1151 | 480 | 480 | 1 |
| 1151 | 960 | 960 | 1 |
| 1151 | 1920 | 1920 | 1 |
| 1151 | 3840 | 3840 | 1 |

TABLE 7

| $L_{RA}$ | $\Delta f_{RA}$ | $\Delta f$ | $\bar{k}$ |
|---|---|---|---|
| 139 | 240 | 240 | 2 |
| 139 | 480 | 480 | 2 |
| 139 | 960 | 960 | 2 |

TABLE 7-continued

| $L_{RA}$ | $\Delta f_{RA}$ | $\Delta f$ | $\bar{k}$ |
|---|---|---|---|
| 139 | 1920 | 1920 | 2 |
| 139 | 3840 | 3840 | 2 |
| 571 | 240 | 240 | 2 |
| 571 | 960 | 960 | 2 |
| 571 | 1920 | 1920 | 2 |
| 571 | 3840 | 3840 | 2 |
| 1151 | 480 | 480 | 0 |
| 1151 | 960 | 960 | 0 |
| 1151 | 1920 | 1920 | 0 |
| 1151 | 3840 | 3840 | 0 |

TABLE 8

| $L_{RA}$ | $\Delta f_{RA}$ | $\Delta f$ | $\bar{k}$ |
|---|---|---|---|
| 139 | 120 | 240 | 2 |
| 139 | 120 | 480 | 1 |
| 139 | 240 | 480 | 2 |
| 139 | 120 | 960 | 23 |
| 139 | 240 | 960 | 1 |
| 139 | 480 | 960 | 2 |
| 139 | 120 | 1920 | 19 |
| 139 | 240 | 1920 | 23 |
| 139 | 480 | 1920 | 1 |
| 139 | 960 | 1920 | 2 |
| 139 | 120 | 3840 | 107 |
| 139 | 240 | 3840 | 19 |
| 139 | 480 | 3840 | 23 |
| 139 | 960 | 3840 | 1 |
| 139 | 1920 | 3840 | 2 |
| 571 | 120 | 240 | 2 |
| 571 | 120 | 480 | 1 |
| 571 | 240 | 480 | 2 |
| 571 | 120 | 960 | −1 |
| 571 | 240 | 960 | 1 |
| 571 | 480 | 960 | 2 |
| 571 | 120 | 1920 | −5 |
| 571 | 240 | 1920 | −1 |
| 571 | 480 | 1920 | 1 |
| 571 | 960 | 1920 | 2 |
| 571 | 120 | 3840 | 83 |
| 571 | 240 | 3840 | −5 |
| 571 | 480 | 3840 | −1 |
| 571 | 960 | 3840 | 1 |
| 571 | 1920 | 3840 | 2 |
| 1151 | 120 | 240 | 0 |
| 1151 | 120 | 480 | −1 |
| 1151 | 240 | 480 | 0 |
| 1151 | 120 | 960 | −3 |
| 1151 | 240 | 960 | −1 |
| 1151 | 480 | 960 | 0 |
| 1151 | 120 | 1920 | −7 |
| 1151 | 240 | 1920 | −3 |
| 1151 | 480 | 1920 | −1 |
| 1151 | 960 | 1920 | 0 |
| 1151 | 120 | 3840 | −15 |
| 1151 | 240 | 3840 | −7 |
| 1151 | 480 | 3840 | −3 |
| 1151 | 960 | 3840 | −1 |
| 1151 | 1920 | 3840 | 0 |

It should be understood that the terminal may store a table that is any combination or any transformation of the foregoing tables. This is not limited in this application. For example, the terminal may store only values of parameters supported by the network device or the terminal.

It may be understood that, as shown in Table 6 to Table 8, the value of $\bar{k}$ may be any one of −15, −7, −5, −3, −1, 0, 1, 2, 3, 19, 23, 83, and 107.

Optionally, the first subcarrier quantity and the total subcarrier quantity frequency domain width may be the same, and the second subcarrier quantity is zero.

Specifically, the guard intervals of the random access signal may be set to a maximum at one end and zero at the other end. In this way, impact on other frequency division data may be minimized by the end with a maximum guard interval, thereby improving data demodulation performance. In addition, for the end with a guard interval of zero, the network device may reduce interference by performing scheduling to avoid data transmission or scheduling low MCS data.

Optionally, when the second subcarrier quantity is 0, that is, when the guard interval 2 shown in FIG. 4 is 0, the random access signal subcarrier spacing, the data subcarrier spacing, and the subcarrier quantity parameter meet the following relationship:

$$\bar{k} = \frac{\left(GP - \frac{\Delta f}{2}\right)}{\Delta f_{RA}} + 0.5 \quad (7)$$

where GP represents the total subcarrier quantity frequency domain width, $\Delta f$ represents the data subcarrier spacing, $\Delta f_{RA}$ represents the random access signal subcarrier spacing, and $\bar{k}$ represents the subcarrier quantity parameter.

Specifically, when $L_{RA}$=139, correspondences for $L_{RA}$=139 may be shown in the following Table 9, correspondences for $L_{RA}$=571 may be shown in the following Table 10, and correspondences between $L_{RA}$=1151 may be shown in the following Table 11.

It may be understood that, the terminal may store a table that is any combination or any transformation of Table 9 to Table 11. This is not limited in this application.

Optionally, when the second subcarrier quantity is 0, that is, when the guard interval 2 shown in FIG. 4 is 0, the random access signal subcarrier spacing, the data subcarrier spacing, and the subcarrier quantity parameter may alternatively meet the following relationship:

$$\bar{k} = \frac{\left(GP + \frac{\Delta f}{2}\right)}{\Delta f_{RA}} + 0.5 \quad (8)$$

where GP represents the total subcarrier quantity frequency domain width, $\Delta f$ represents the data subcarrier spacing, $\Delta f_{RA}$ represents the random access signal subcarrier spacing, and $\bar{k}$ represents the subcarrier quantity parameter.

TABLE 9

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 139 | 240 | 60 | 47 | 2.375 | 2 | 3 | 2 |
| 139 | 480 | 60 | 93 | 0.9375 | 1 | 1 | 0 |
| 139 | 960 | 60 | 186 | 0.96875 | 1 | 1 | 0 |
| 139 | 1920 | 60 | 371 | 0.609375 | 1 | 1 | 0 |
| 139 | 3840 | 60 | 742 | 0.617188 | 1 | 1 | 0 |
| 139 | 240 | 120 | 24 | 5.25 | 5 | 6 | 5 |
| 139 | 480 | 120 | 47 | 2.375 | 2 | 3 | 2 |
| 139 | 960 | 120 | 93 | 0.9375 | 1 | 1 | 0 |
| 139 | 1920 | 120 | 186 | 0.96875 | 1 | 1 | 0 |
| 139 | 3840 | 120 | 371 | 0.609375 | 1 | 1 | 0 |
| 139 | 120 | 240 | 6 | 4.5 | 5 | 5 | 4 |
| 139 | 240 | 240 | 12 | 5 | 5 | 5 | 5 |
| 139 | 480 | 240 | 24 | 5.25 | 5 | 6 | 5 |
| 139 | 960 | 240 | 47 | 2.375 | 2 | 3 | 2 |
| 139 | 1920 | 240 | 93 | 0.9375 | 1 | 1 | 0 |

TABLE 9-continued

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 139 | 3840 | 240 | 186 | 0.96875 | 1 | 1 | 0 |
| 139 | 120 | 480 | 3 | 3.5 | 4 | 4 | 3 |
| 139 | 240 | 480 | 6 | 4.5 | 5 | 5 | 4 |
| 139 | 480 | 480 | 12 | 5 | 5 | 5 | 5 |
| 139 | 960 | 480 | 24 | 5.25 | 5 | 6 | 5 |
| 139 | 1920 | 480 | 47 | 2.375 | 2 | 3 | 2 |
| 139 | 3840 | 480 | 93 | 0.9375 | 1 | 1 | 0 |
| 139 | 120 | 960 | 2 | 49.5 | 50 | 50 | 49 |
| 139 | 240 | 960 | 3 | 3.5 | 4 | 4 | 3 |
| 139 | 480 | 960 | 6 | 4.5 | 5 | 5 | 4 |
| 139 | 960 | 960 | 12 | 5 | 5 | 5 | 5 |
| 139 | 1920 | 960 | 24 | 5.25 | 5 | 6 | 5 |
| 139 | 3840 | 960 | 47 | 2.375 | 2 | 3 | 2 |
| 139 | 120 | 1920 | 1 | 45.5 | 46 | 46 | 45 |
| 139 | 240 | 1920 | 2 | 49.5 | 50 | 50 | 49 |
| 139 | 480 | 1920 | 3 | 3.5 | 4 | 4 | 3 |
| 139 | 960 | 1920 | 6 | 4.5 | 5 | 5 | 4 |
| 139 | 1920 | 1920 | 12 | 5 | 5 | 5 | 5 |
| 139 | 3840 | 1920 | 24 | 5.25 | 5 | 6 | 5 |
| 139 | 120 | 3840 | 1 | 229.5 | 230 | 230 | 229 |
| 139 | 240 | 3840 | 1 | 45.5 | 46 | 46 | 45 |
| 139 | 480 | 3840 | 2 | 49.5 | 50 | 50 | 49 |
| 139 | 960 | 3840 | 3 | 3.5 | 4 | 4 | 3 |
| 139 | 1920 | 3840 | 6 | 4.5 | 5 | 5 | 4 |
| 139 | 3840 | 3840 | 12 | 5 | 5 | 5 | 5 |

TABLE 10

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 571 | 240 | 60 | 191 | 2.375 | 2 | 3 | 2 |
| 571 | 480 | 60 | 381 | 0.9375 | 1 | 1 | 0 |
| 571 | 960 | 60 | 762 | 0.96875 | 1 | 1 | 0 |
| 571 | 1920 | 60 | 1523 | 0.609375 | 1 | 1 | 0 |
| 571 | 3840 | 60 | 3046 | 0.617188 | 1 | 1 | 0 |
| 571 | 240 | 120 | 96 | 5.25 | 5 | 6 | 5 |
| 571 | 480 | 120 | 191 | 2.375 | 2 | 3 | 2 |
| 571 | 960 | 120 | 381 | 0.9375 | 1 | 1 | 0 |
| 571 | 1920 | 120 | 762 | 0.96875 | 1 | 1 | 0 |
| 571 | 3840 | 120 | 1523 | 0.609375 | 1 | 1 | 0 |
| 571 | 120 | 240 | 24 | 4.5 | 5 | 5 | 4 |
| 571 | 240 | 240 | 48 | 5 | 5 | 5 | 5 |
| 571 | 480 | 240 | 96 | 5.25 | 5 | 6 | 5 |
| 571 | 960 | 240 | 191 | 2.375 | 2 | 3 | 2 |
| 571 | 1920 | 240 | 381 | 0.9375 | 1 | 1 | 0 |
| 571 | 3840 | 240 | 762 | 0.96875 | 1 | 1 | 0 |
| 571 | 120 | 480 | 12 | 3.5 | 4 | 4 | 3 |
| 571 | 240 | 480 | 24 | 4.5 | 5 | 5 | 4 |
| 571 | 480 | 480 | 48 | 5 | 5 | 5 | 5 |
| 571 | 960 | 480 | 96 | 5.25 | 5 | 6 | 5 |
| 571 | 1920 | 480 | 191 | 2.375 | 2 | 3 | 2 |
| 571 | 3840 | 480 | 381 | 0.9375 | 1 | 1 | 0 |
| 571 | 120 | 960 | 6 | 1.5 | 2 | 2 | 1 |
| 571 | 240 | 960 | 12 | 3.5 | 4 | 4 | 3 |
| 571 | 480 | 960 | 24 | 4.5 | 5 | 5 | 4 |
| 571 | 960 | 960 | 48 | 5 | 5 | 5 | 5 |
| 571 | 1920 | 960 | 96 | 5.25 | 5 | 6 | 5 |
| 571 | 3840 | 960 | 191 | 2.375 | 2 | 3 | 2 |
| 571 | 120 | 1920 | 3 | -2.5 | -3 | -2 | -3 |
| 571 | 240 | 1920 | 6 | 1.5 | 2 | 2 | 1 |
| 571 | 480 | 1920 | 12 | 3.5 | 4 | 4 | 3 |
| 571 | 960 | 1920 | 24 | 4.5 | 5 | 5 | 4 |
| 571 | 1920 | 1920 | 48 | 5 | 5 | 5 | 5 |
| 571 | 3840 | 1920 | 96 | 5.25 | 5 | 6 | 5 |
| 571 | 120 | 3840 | 2 | 181.5 | 182 | 182 | 181 |
| 571 | 240 | 3840 | 3 | -2.5 | -3 | -2 | -3 |
| 571 | 480 | 3840 | 6 | 1.5 | 2 | 2 | 1 |
| 571 | 960 | 3840 | 12 | 3.5 | 4 | 4 | 3 |
| 571 | 1920 | 3840 | 24 | 4.5 | 5 | 5 | 4 |
| 571 | 3840 | 3840 | 48 | 5 | 5 | 5 | 5 |

TABLE 11

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 1151 | 240 | 60 | 384 | 1.375 | 1 | 2 | 1 |
| 1151 | 480 | 60 | 768 | 1.4375 | 1 | 2 | 1 |
| 1151 | 960 | 60 | 1535 | 0.71875 | 1 | 1 | 0 |
| 1151 | 1920 | 60 | 3070 | 0.734375 | 1 | 1 | 0 |
| 1151 | 3840 | 60 | 6139 | 0.554688 | 1 | 1 | 0 |
| 1151 | 240 | 120 | 192 | 1.25 | 1 | 2 | 1 |
| 1151 | 480 | 120 | 384 | 1.375 | 1 | 2 | 1 |
| 1151 | 960 | 120 | 768 | 1.4375 | 1 | 2 | 1 |
| 1151 | 1920 | 120 | 1535 | 0.71875 | 1 | 1 | 0 |
| 1151 | 3840 | 120 | 3070 | 0.734375 | 1 | 1 | 0 |
| 1151 | 120 | 240 | 48 | 0.5 | 1 | 1 | 0 |
| 1151 | 240 | 240 | 96 | 1 | 1 | 1 | 1 |
| 1151 | 480 | 240 | 192 | 1.25 | 1 | 2 | 1 |
| 1151 | 960 | 240 | 384 | 1.375 | 1 | 2 | 1 |
| 1151 | 1920 | 240 | 768 | 1.4375 | 1 | 2 | 1 |
| 1151 | 3840 | 240 | 1535 | 0.71875 | 1 | 1 | 0 |
| 1151 | 120 | 480 | 24 | -0.5 | -1 | 0 | -1 |
| 1151 | 240 | 480 | 48 | 0.5 | 1 | 1 | 0 |
| 1151 | 480 | 480 | 96 | 1 | 1 | 1 | 1 |
| 1151 | 960 | 480 | 192 | 1.25 | 1 | 2 | 1 |
| 1151 | 1920 | 480 | 384 | 1.375 | 1 | 2 | 1 |
| 1151 | 3840 | 480 | 768 | 1.4375 | 1 | 2 | 1 |
| 1151 | 120 | 960 | 12 | -2.5 | -3 | -2 | -3 |
| 1151 | 240 | 960 | 24 | -0.5 | -1 | 0 | -1 |
| 1151 | 480 | 960 | 48 | 0.5 | 1 | 1 | 0 |
| 1151 | 960 | 960 | 96 | 1 | 1 | 1 | 1 |
| 1151 | 1920 | 960 | 192 | 1.25 | 1 | 2 | 1 |
| 1151 | 3840 | 960 | 384 | 1.375 | 1 | 2 | 1 |
| 1151 | 120 | 1920 | 6 | -6.5 | -7 | -6 | -7 |
| 1151 | 240 | 1920 | 12 | -2.5 | -3 | -2 | -3 |
| 1151 | 480 | 1920 | 24 | -0.5 | -1 | 0 | -1 |
| 1151 | 960 | 1920 | 48 | 0.5 | 1 | 1 | 0 |
| 1151 | 1920 | 1920 | 96 | 1 | 1 | 1 | 1 |
| 1151 | 3840 | 1920 | 192 | 1.25 | 1 | 2 | 1 |
| 1151 | 120 | 3840 | 3 | -14.5 | -15 | -14 | -15 |
| 1151 | 240 | 3840 | 6 | -6.5 | -7 | -6 | -7 |
| 1151 | 480 | 3840 | 12 | -2.5 | -3 | -2 | -3 |
| 1151 | 960 | 3840 | 24 | -0.5 | -1 | 0 | -1 |
| 1151 | 1920 | 3840 | 48 | 0.5 | 1 | 1 | 0 |
| 1151 | 3840 | 3840 | 96 | 1 | 1 | 1 | 1 |

In another embodiment, step 602 may be specifically as follows: The terminal directly determines the subcarrier quantity parameter based on the random access signal subcarrier spacing and the data subcarrier spacing in the configuration information.

Specifically, the terminal may determine the subcarrier quantity parameter with reference to the random access signal subcarrier spacing and the data subcarrier spacing. For example, the terminal may store a mapping relationship of the random access signal subcarrier spacing and the data subcarrier spacing with the subcarrier quantity parameter. The mapping relationship may be implemented by using a formula, or may be implemented by using a table. This is not limited in this application.

Optionally, the second subcarrier quantity and the total subcarrier quantity frequency domain width may be the same, and the first subcarrier quantity is zero.

Optionally, when the first subcarrier quantity is 0, that is, when the guard interval 1 shown in FIG. 4 is 0, the random access signal subcarrier spacing, the data subcarrier spacing, and the subcarrier quantity parameter meet the following relationship:

$$\bar{k} = \frac{\left(0 - \frac{\Delta f}{2}\right)}{\Delta f_{RA}} + 0.5 \tag{9}$$

where $\Delta f$ represents the data subcarrier spacing, $\Delta f_{RA}$ represents the random access signal subcarrier spacing, and $\bar{k}$ represents the subcarrier quantity parameter.

Specifically, the terminal determines a value of $\bar{k}$ based on formula (9), that is, the terminal moves a location of a subcarrier to which the random access preamble is mapped toward a center of the random access channel, thereby helping reduce interference with another data channel.

Optionally, the random access signal subcarrier spacing, the data subcarrier spacing, and the subcarrier quantity parameter may alternatively meet the following relationship:

$$\bar{k} = \frac{\Delta f}{2\Delta f_{RA}} + 0.5 \quad (10)$$

Specifically, the terminal determines a value of $\bar{k}$ based on formula (10), that is, the terminal moves a location of a subcarrier to which the random access preamble is mapped toward a center of the random access channel, thereby helping reduce interference with another data channel.

Specifically, when $L_{RA}$=139, correspondences for $L_{RA}$=139 may be shown in the following Table 12 or Table 13, correspondences for $L_{RA}$=571 may be shown in the following Table 14 or Table 15, and correspondences between $L_{RA}$=1151 may be shown in the following Table 16 or Table 17.

It may be understood that, the terminal may store a table that is any combination or any transformation of either Table 12 or Table 13, either Table 14 or Table 15, and either Table 16 or Table 17. This is not limited in this application.

It should be noted that Table 12, Table 14, and Table 16 may be obtained by calculation based on formula (9), and Table 13, Table 15, and Table 17 may be obtained by calculation based on formula (10).

TABLE 12

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 139 | 240 | 60 | 41 | 0.375 | 0 | 1 | 0 |
| 139 | 480 | 60 | 93 | 0.4375 | 0 | 1 | 0 |
| 139 | 960 | 60 | 186 | 0.46875 | 0 | 1 | 0 |
| 139 | 1920 | 60 | 371 | 0.484375 | 0 | 1 | 0 |
| 139 | 3840 | 60 | 742 | 0.492188 | 0 | 1 | 0 |
| 139 | 240 | 120 | 24 | 0.25 | 0 | 1 | 0 |
| 139 | 480 | 120 | 47 | 0.375 | 0 | 1 | 0 |
| 139 | 960 | 120 | 93 | 0.4375 | 0 | 1 | 0 |
| 139 | 1920 | 120 | 186 | 0.46875 | 0 | 1 | 0 |
| 139 | 3840 | 120 | 371 | 0.484375 | 0 | 1 | 0 |
| 139 | 120 | 240 | 6 | −0.5 | −1 | 0 | −1 |
| 139 | 240 | 240 | 12 | 0 | 0 | 0 | 0 |
| 139 | 480 | 240 | 24 | 0.25 | 0 | 1 | 0 |
| 139 | 960 | 240 | 47 | 0.375 | 0 | 1 | 0 |
| 139 | 1920 | 240 | 93 | 0.4375 | 0 | 1 | 0 |
| 139 | 3840 | 240 | 186 | 0.46875 | 0 | 1 | 0 |
| 139 | 120 | 480 | 3 | −1.5 | −2 | −1 | −2 |
| 139 | 240 | 480 | 6 | −0.5 | −1 | 0 | −1 |
| 139 | 480 | 480 | 12 | 0 | 0 | 0 | 0 |
| 139 | 960 | 480 | 24 | 0.25 | 0 | 1 | 0 |
| 139 | 1920 | 480 | 47 | 0.375 | 0 | 1 | 0 |
| 139 | 3840 | 480 | 93 | 0.4375 | 0 | 1 | 0 |
| 139 | 120 | 960 | 2 | −3.5 | −4 | −3 | −4 |
| 139 | 240 | 960 | 3 | −1.5 | −2 | −1 | −2 |
| 139 | 480 | 960 | 6 | −0.5 | −1 | 0 | −1 |
| 139 | 960 | 960 | 12 | 0 | 0 | 0 | 0 |
| 139 | 1920 | 960 | 24 | 0.25 | 0 | 1 | 0 |
| 139 | 3840 | 960 | 47 | 0.375 | 0 | 1 | 0 |
| 139 | 120 | 1920 | 1 | −7.5 | −8 | −7 | −8 |
| 139 | 240 | 1920 | 2 | −3.5 | −4 | −3 | −4 |
| 139 | 480 | 1920 | 3 | −1.5 | −2 | −1 | −2 |
| 139 | 960 | 1920 | 6 | −0.5 | −1 | 0 | −1 |
| 139 | 1920 | 1920 | 12 | 0 | 0 | 0 | 0 |
| 139 | 3840 | 1920 | 24 | 0.25 | 0 | 1 | 0 |
| 139 | 120 | 3840 | 1 | −15.5 | −16 | −15 | −16 |
| 139 | 240 | 3840 | 1 | −7.5 | −8 | −7 | −8 |

TABLE 12-continued

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 139 | 480 | 3840 | 2 | −3.5 | −4 | −3 | −4 |
| 139 | 960 | 3840 | 3 | −1.5 | −2 | −1 | −2 |
| 139 | 1920 | 3840 | 6 | −0.5 | −1 | 0 | −1 |
| 139 | 3840 | 3840 | 12 | 0 | 0 | 0 | 0 |

TABLE 13

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 139 | 240 | 60 | 41 | 0.625 | 1 | 1 | 0 |
| 139 | 480 | 60 | 93 | 0.5625 | 1 | 1 | 0 |
| 139 | 960 | 60 | 186 | 0.53125 | 1 | 1 | 0 |
| 139 | 1920 | 60 | 371 | 0.515625 | 1 | 1 | 0 |
| 139 | 3840 | 60 | 742 | 0.5078125 | 1 | 1 | 0 |
| 139 | 240 | 120 | 24 | 0.75 | 1 | 1 | 0 |
| 139 | 480 | 120 | 47 | 0.625 | 1 | 1 | 0 |
| 139 | 960 | 120 | 93 | 0.5625 | 1 | 1 | 0 |
| 139 | 1920 | 120 | 186 | 0.53125 | 1 | 1 | 0 |
| 139 | 3840 | 120 | 371 | 0.515625 | 1 | 1 | 0 |
| 139 | 120 | 240 | 6 | 1.5 | 2 | 2 | 1 |
| 139 | 240 | 240 | 12 | 1 | 1 | 1 | 1 |
| 139 | 480 | 240 | 24 | 0.75 | 1 | 1 | 0 |
| 139 | 960 | 240 | 47 | 0.625 | 1 | 1 | 0 |
| 139 | 1920 | 240 | 93 | 0.5625 | 1 | 1 | 0 |
| 139 | 3840 | 240 | 186 | 0.53125 | 1 | 1 | 0 |
| 139 | 120 | 480 | 3 | 2.5 | 3 | 3 | 2 |
| 139 | 240 | 480 | 6 | 1.5 | 2 | 2 | 1 |
| 139 | 480 | 480 | 12 | 1 | 1 | 1 | 1 |
| 139 | 960 | 480 | 24 | 0.75 | 1 | 1 | 0 |
| 139 | 1920 | 480 | 47 | 0.625 | 1 | 1 | 0 |
| 139 | 3840 | 480 | 93 | 0.5625 | 1 | 1 | 0 |
| 139 | 120 | 960 | 2 | 4.5 | 5 | 5 | 4 |
| 139 | 240 | 960 | 3 | 2.5 | 3 | 3 | 2 |
| 139 | 480 | 960 | 6 | 1.5 | 2 | 2 | 1 |
| 139 | 960 | 960 | 12 | 1 | 1 | 1 | 1 |
| 139 | 1920 | 960 | 24 | 0.75 | 1 | 1 | 0 |
| 139 | 3840 | 960 | 47 | 0.625 | 1 | 1 | 0 |
| 139 | 120 | 1920 | 1 | 8.5 | 9 | 9 | 8 |
| 139 | 240 | 1920 | 2 | 4.5 | 5 | 5 | 4 |
| 139 | 480 | 1920 | 3 | 2.5 | 3 | 3 | 2 |
| 139 | 960 | 1920 | 6 | 1.5 | 2 | 2 | 1 |
| 139 | 1920 | 1920 | 12 | 1 | 1 | 1 | 1 |
| 139 | 3840 | 1920 | 24 | 0.75 | 1 | 1 | 0 |
| 139 | 120 | 3840 | 1 | 16.5 | 17 | 17 | 16 |
| 139 | 240 | 3840 | 1 | 8.5 | 9 | 9 | 8 |
| 139 | 480 | 3840 | 2 | 4.5 | 5 | 5 | 4 |
| 139 | 960 | 3840 | 3 | 2.5 | 3 | 3 | 2 |
| 139 | 1920 | 3840 | 6 | 1.5 | 2 | 2 | 1 |
| 139 | 3840 | 3840 | 12 | 1 | 1 | 1 | 1 |

TABLE 14

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 571 | 240 | 60 | 191 | 0.375 | 0 | 1 | 0 |
| 571 | 480 | 60 | 381 | 0.4375 | 0 | 1 | 0 |
| 571 | 960 | 60 | 762 | 0.46875 | 0 | 1 | 0 |
| 571 | 1920 | 60 | 1523 | 0.484375 | 0 | 1 | 0 |
| 571 | 3840 | 60 | 3046 | 0.492188 | 0 | 1 | 0 |
| 571 | 240 | 120 | 96 | 0.25 | 0 | 1 | 0 |
| 571 | 480 | 120 | 191 | 0.375 | 0 | 1 | 0 |
| 571 | 960 | 120 | 381 | 0.4375 | 0 | 1 | 0 |
| 571 | 1920 | 120 | 762 | 0.46875 | 0 | 1 | 0 |
| 571 | 3840 | 120 | 1523 | 0.484375 | 0 | 1 | 0 |
| 571 | 120 | 240 | 24 | −0.5 | −1 | 0 | −1 |
| 571 | 240 | 240 | 48 | 0 | 0 | 0 | 0 |
| 571 | 480 | 240 | 96 | 0.25 | 0 | 1 | 0 |
| 571 | 960 | 240 | 191 | 0.375 | 0 | 1 | 0 |
| 571 | 1920 | 240 | 381 | 0.4375 | 0 | 1 | 0 |
| 571 | 3840 | 240 | 762 | 0.46875 | 0 | 1 | 0 |
| 571 | 120 | 480 | 12 | −1.5 | −2 | −1 | −2 |
| 571 | 240 | 480 | 24 | −0.5 | −1 | 0 | −1 |
| 571 | 480 | 480 | 48 | 0 | 0 | 0 | 0 |

TABLE 14-continued

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 571 | 960 | 480 | 96 | 0.25 | 0 | 1 | 0 |
| 571 | 1920 | 480 | 191 | 0.375 | 0 | 1 | 0 |
| 571 | 3840 | 480 | 381 | 0.4375 | 0 | 1 | 0 |
| 571 | 120 | 960 | 6 | −3.5 | −4 | −3 | −4 |
| 571 | 240 | 960 | 12 | −1.5 | −2 | −1 | −2 |
| 571 | 480 | 960 | 24 | −0.5 | −1 | 0 | −1 |
| 571 | 960 | 960 | 48 | 0 | 0 | 0 | 0 |
| 571 | 1920 | 960 | 96 | 0.25 | 0 | 1 | 0 |
| 571 | 3840 | 960 | 191 | 0.375 | 0 | 1 | 0 |
| 571 | 120 | 1920 | 3 | −7.5 | −8 | −7 | −8 |
| 571 | 240 | 1920 | 6 | −3.5 | −4 | −3 | −4 |
| 571 | 480 | 1920 | 12 | −1.5 | −2 | −1 | −2 |
| 571 | 960 | 1920 | 24 | −0.5 | −1 | 0 | −1 |
| 571 | 1920 | 1920 | 48 | 0 | 0 | 0 | 0 |
| 571 | 3840 | 1920 | 96 | 0.25 | 0 | 1 | 0 |
| 571 | 120 | 3840 | 2 | −15.5 | −16 | −15 | −16 |
| 571 | 240 | 3840 | 3 | −7.5 | −8 | −7 | −8 |
| 571 | 480 | 3840 | 6 | −3.5 | −4 | −3 | −4 |
| 571 | 960 | 3840 | 12 | −1.5 | −2 | −1 | −2 |
| 571 | 1920 | 3840 | 24 | −0.5 | −1 | 0 | −1 |
| 571 | 3840 | 3840 | 48 | 0 | 0 | 0 | 0 |

TABLE 15

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 571 | 240 | 60 | 191 | 0.625 | 1 | 1 | 0 |
| 571 | 480 | 60 | 381 | 0.5625 | 1 | 1 | 0 |
| 571 | 960 | 60 | 762 | 0.53125 | 1 | 1 | 0 |
| 571 | 1920 | 60 | 1523 | 0.515625 | 1 | 1 | 0 |
| 571 | 3840 | 60 | 3046 | 0.5078125 | 1 | 1 | 0 |
| 571 | 240 | 120 | 96 | 0.75 | 1 | 1 | 0 |
| 571 | 480 | 120 | 191 | 0.625 | 1 | 1 | 0 |
| 571 | 960 | 120 | 381 | 0.5625 | 1 | 1 | 0 |
| 571 | 1920 | 120 | 762 | 0.53125 | 1 | 1 | 0 |
| 571 | 3840 | 120 | 1523 | 0.515625 | 1 | 1 | 0 |
| 571 | 120 | 240 | 24 | 1.5 | 2 | 2 | 1 |
| 571 | 240 | 240 | 48 | 1 | 1 | 1 | 1 |
| 571 | 480 | 240 | 96 | 0.75 | 1 | 1 | 0 |
| 571 | 960 | 240 | 191 | 0.625 | 1 | 1 | 0 |
| 571 | 1920 | 240 | 381 | 0.5625 | 1 | 1 | 0 |
| 571 | 3840 | 240 | 762 | 0.53125 | 1 | 1 | 0 |
| 571 | 120 | 480 | 12 | 2.5 | 3 | 3 | 2 |
| 571 | 240 | 480 | 24 | 1.5 | 2 | 2 | 1 |
| 571 | 480 | 480 | 48 | 1 | 1 | 1 | 1 |
| 571 | 960 | 480 | 96 | 0.75 | 1 | 1 | 0 |
| 571 | 1920 | 480 | 191 | 0.625 | 1 | 1 | 0 |
| 571 | 3840 | 480 | 381 | 0.5625 | 1 | 1 | 0 |
| 571 | 120 | 960 | 6 | 4.5 | 5 | 5 | 4 |
| 571 | 240 | 960 | 12 | 2.5 | 3 | 3 | 2 |
| 571 | 480 | 960 | 24 | 1.5 | 2 | 2 | 1 |
| 571 | 960 | 960 | 48 | 1 | 1 | 1 | 1 |
| 571 | 1920 | 960 | 96 | 0.75 | 1 | 1 | 0 |
| 571 | 3840 | 960 | 191 | 0.625 | 1 | 1 | 0 |
| 571 | 120 | 1920 | 3 | 8.5 | 9 | 9 | 8 |
| 571 | 240 | 1920 | 6 | 4.5 | 5 | 5 | 4 |
| 571 | 480 | 1920 | 12 | 2.5 | 3 | 3 | 2 |
| 571 | 960 | 1920 | 24 | 1.5 | 2 | 2 | 1 |
| 571 | 1920 | 1920 | 48 | 1 | 1 | 1 | 1 |
| 571 | 3840 | 1920 | 96 | 0.75 | 1 | 1 | 0 |
| 571 | 120 | 3840 | 2 | 16.5 | 17 | 17 | 16 |
| 571 | 240 | 3840 | 3 | 8.5 | 9 | 9 | 8 |
| 571 | 480 | 3840 | 6 | 4.5 | 5 | 5 | 4 |
| 571 | 960 | 3840 | 12 | 2.5 | 3 | 3 | 2 |
| 571 | 1920 | 3840 | 24 | 1.5 | 2 | 2 | 1 |
| 571 | 3840 | 3840 | 48 | 1 | 1 | 1 | 1 |

TABLE 16

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 1151 | 240 | 60 | 384 | 0.375 | 0 | 1 | 0 |
| 1151 | 480 | 60 | 768 | 0.4375 | 0 | 1 | 0 |

TABLE 16-continued

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 1151 | 960 | 60 | 1535 | 0.46875 | 0 | 1 | 0 |
| 1151 | 1920 | 60 | 3070 | 0.484375 | 0 | 1 | 0 |
| 1151 | 3840 | 60 | 6139 | 0.492188 | 0 | 1 | 0 |
| 1151 | 240 | 120 | 192 | 0.25 | 0 | 1 | 0 |
| 1151 | 480 | 120 | 384 | 0.375 | 0 | 1 | 0 |
| 1151 | 960 | 120 | 768 | 0.4375 | 0 | 1 | 0 |
| 1151 | 1920 | 120 | 1535 | 0.46875 | 0 | 1 | 0 |
| 1151 | 3840 | 120 | 3070 | 0.484375 | 0 | 1 | 0 |
| 1151 | 120 | 240 | 48 | −0.5 | −1 | 0 | −1 |
| 1151 | 240 | 240 | 96 | 0 | 0 | 0 | 0 |
| 1151 | 480 | 240 | 192 | 0.25 | 0 | 1 | 0 |
| 1151 | 960 | 240 | 384 | 0.375 | 0 | 1 | 0 |
| 1151 | 1920 | 240 | 768 | 0.4375 | 0 | 1 | 0 |
| 1151 | 3840 | 240 | 1535 | 0.46875 | 0 | 1 | 0 |
| 1151 | 120 | 480 | 24 | −1.5 | −2 | −1 | −2 |
| 1151 | 240 | 480 | 48 | −0.5 | −1 | 0 | −1 |
| 1151 | 480 | 480 | 96 | 0 | 0 | 0 | 0 |
| 1151 | 960 | 480 | 192 | 0.25 | 0 | 1 | 0 |
| 1151 | 1920 | 480 | 384 | 0.375 | 0 | 1 | 0 |
| 1151 | 3840 | 480 | 768 | 0.4375 | 0 | 1 | 0 |
| 1151 | 120 | 960 | 12 | −3.5 | −4 | −3 | −4 |
| 1151 | 240 | 960 | 24 | −1.5 | −2 | −1 | −2 |
| 1151 | 480 | 960 | 48 | −0.5 | −1 | 0 | −1 |
| 1151 | 960 | 960 | 96 | 0 | 0 | 0 | 0 |
| 1151 | 1920 | 960 | 192 | 0.25 | 0 | 1 | 0 |
| 1151 | 3840 | 960 | 384 | 0.375 | 0 | 1 | 0 |
| 1151 | 120 | 1920 | 6 | −7.5 | −8 | −7 | −8 |
| 1151 | 240 | 1920 | 12 | −3.5 | −4 | −3 | −4 |
| 1151 | 480 | 1920 | 24 | −1.5 | −2 | −1 | −2 |
| 1151 | 960 | 1920 | 48 | −0.5 | −1 | 0 | −1 |
| 1151 | 1920 | 1920 | 96 | 0 | 0 | 0 | 0 |
| 1151 | 3840 | 1920 | 192 | 0.25 | 0 | 1 | 0 |
| 1151 | 120 | 3840 | 3 | −15.5 | −16 | −15 | −16 |
| 1151 | 240 | 3840 | 6 | −7.5 | −8 | −7 | −8 |
| 1151 | 480 | 3840 | 12 | −3.5 | −4 | −3 | −4 |
| 1151 | 960 | 3840 | 24 | −1.5 | −2 | −1 | −2 |
| 1151 | 1920 | 3840 | 48 | −0.5 | −1 | 0 | −1 |
| 1151 | 3840 | 3840 | 96 | 0 | 0 | 0 | 0 |

TABLE 17

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 1151 | 240 | 60 | 384 | 0.625 | 1 | 1 | 0 |
| 1151 | 480 | 60 | 768 | 0.5625 | 1 | 1 | 0 |
| 1151 | 960 | 60 | 1535 | 0.53125 | 1 | 1 | 0 |
| 1151 | 1920 | 60 | 3070 | 0.515625 | 1 | 1 | 0 |
| 1151 | 3840 | 60 | 6139 | 0.5078125 | 1 | 1 | 0 |
| 1151 | 240 | 120 | 192 | 0.75 | 1 | 1 | 0 |
| 1151 | 480 | 120 | 384 | 0.625 | 1 | 1 | 0 |
| 1151 | 960 | 120 | 768 | 0.5625 | 1 | 1 | 0 |
| 1151 | 1920 | 120 | 1535 | 0.53125 | 1 | 1 | 0 |
| 1151 | 3840 | 120 | 3070 | 0.515625 | 1 | 1 | 0 |
| 1151 | 120 | 240 | 48 | 1.5 | 2 | 2 | 1 |
| 1151 | 240 | 240 | 96 | 1 | 1 | 1 | 1 |
| 1151 | 480 | 240 | 192 | 0.75 | 1 | 1 | 0 |
| 1151 | 960 | 240 | 384 | 0.625 | 1 | 1 | 0 |
| 1151 | 1920 | 240 | 768 | 0.5625 | 1 | 1 | 0 |
| 1151 | 3840 | 240 | 1535 | 0.53125 | 1 | 1 | 0 |
| 1151 | 120 | 480 | 24 | 2.5 | 3 | 3 | 2 |
| 1151 | 240 | 480 | 48 | 1.5 | 2 | 2 | 1 |
| 1151 | 480 | 480 | 96 | 1 | 1 | 1 | 1 |
| 1151 | 960 | 480 | 192 | 0.75 | 1 | 1 | 0 |
| 1151 | 1920 | 480 | 384 | 0.625 | 1 | 1 | 0 |
| 1151 | 3840 | 480 | 768 | 0.5625 | 1 | 1 | 0 |
| 1151 | 120 | 960 | 12 | 4.5 | 5 | 5 | 4 |
| 1151 | 240 | 960 | 24 | 2.5 | 3 | 3 | 2 |
| 1151 | 480 | 960 | 48 | 1.5 | 2 | 2 | 1 |
| 1151 | 960 | 960 | 96 | 1 | 1 | 1 | 1 |
| 1151 | 1920 | 960 | 192 | 0.75 | 1 | 1 | 0 |
| 1151 | 3840 | 960 | 384 | 0.625 | 1 | 1 | 0 |
| 1151 | 120 | 1920 | 6 | 8.5 | 9 | 9 | 8 |
| 1151 | 240 | 1920 | 12 | 4.5 | 5 | 5 | 4 |
| 1151 | 480 | 1920 | 24 | 2.5 | 3 | 3 | 2 |
| 1151 | 960 | 1920 | 48 | 1.5 | 2 | 2 | 1 |

TABLE 17-continued

| $L_{RA}$ | $\Delta f_{RA}$ | $\Delta f$ | $N_{RB}^{RA}$ | $\bar{k}$ | Round | Ceil | Floor |
|---|---|---|---|---|---|---|---|
| 1151 | 1920 | 1920 | 96 | 1 | 1 | 1 | 1 |
| 1151 | 3840 | 1920 | 192 | 0.75 | 1 | 1 | 0 |
| 1151 | 120 | 3840 | 3 | 16.5 | 17 | 17 | 16 |
| 1151 | 240 | 3840 | 6 | 8.5 | 9 | 9 | 8 |
| 1151 | 480 | 3840 | 12 | 4.5 | 5 | 5 | 4 |
| 1151 | 960 | 3840 | 24 | 2.5 | 3 | 3 | 2 |
| 1151 | 1920 | 3840 | 48 | 1.5 | 2 | 2 | 1 |
| 1151 | 3840 | 3840 | 96 | 1 | 1 | 1 | 1 |

603. The terminal generates a random access signal based on the subcarrier quantity parameter.

Specifically, the terminal may generate the random access signal based on the subcarrier quantity parameter and a random access formula. The random access formula may be shown in formula (1).

It may be understood that any transformation may be performed on formula (1), and falls within the protection scope of this application. In addition, the random access formula for generating the random access signal by the terminal may alternatively be another formula. This is not limited in this application.

604. The terminal sends the random access signal.

Specifically, the terminal may send the random access signal to the network device. Correspondingly, the network device may receive the random access signal from the terminal. If the terminal sends the random access signal generated based on formula (1), the terminal may send the random access signal through an antenna port p.

Therefore, in this embodiment of this application, the terminal receives the configuration information, and determines the subcarrier quantity parameter with reference to at least one of the random access preamble length, the random access signal subcarrier spacing, and the data subcarrier spacing that are indicated by the configuration information. In this way, the terminal can generate an accurate random access signal, thereby improving random access efficiency.

The embodiments described in this specification may be independent solutions, or may be combined based on intrinsic logic. These solutions all fall within the protection scope of this application.

It may be understood that, in the foregoing method embodiments, methods and operations implemented by the terminal may alternatively be implemented by a component (for example, a chip or a circuit) that can be applied to the terminal, and methods and operations implemented by the network device may alternatively be implemented by a component (for example, a chip or a circuit) that can be applied to the network device.

The foregoing mainly describes the solutions provided in embodiments of this application from the perspective of interaction between network elements. It may be understood that, to implement the foregoing functions, each network element, such as the transmit end device or the receive end device, includes a corresponding hardware structure and/or software module for performing each function. A person skilled in the art should be aware that units, algorithms, and steps in the examples described with reference to the embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, function module division may be performed on the transmit end device or the receive end device based on the foregoing method examples. For example, each function module may be obtained through division corresponding to each function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in actual implementation. The following provides a description by using an example in which each function module is obtained through division corresponding to each function.

It should be understood that specific examples in embodiments of this application are merely intended to help a person skilled in the art better understand the embodiments of this application, but are not intended to limit the scope of the embodiments of this application.

It should be understood that sequence numbers of the foregoing processes do not mean execution sequences in embodiments of this application. The execution sequences of the processes should be determined based on functions and internal logic of the processes, and should not constitute any limitation on implementation processes of the embodiments of this application.

The method provided in the embodiments of this application is described above in detail with reference to FIG. 4 to FIG. 7. The apparatus provided in the embodiments of this application is described below in detail with reference to FIG. 8 to FIG. 15. It should be understood that the description of the apparatus embodiments corresponds to the description of the method embodiments. Therefore, for content that is not described in detail, refer to the foregoing method embodiments. For brevity, details are not described herein again.

Figure 8:
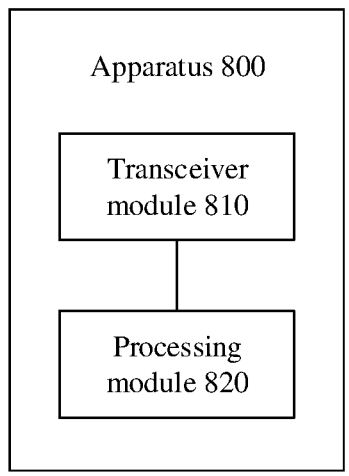
FIG. 8 is a schematic block diagram of an apparatus for transmitting a random access signal according to an embodiment of this application.

FIG. 8 is a schematic block diagram of an apparatus 800 for transmitting a random access signal according to an embodiment of this application.

It should be understood that, the apparatus 800 may correspond to each terminal or a chip in the terminal shown in FIG. 1, or the terminal or a chip in the terminal in the embodiment shown in FIG. 6, and may have any function of the terminal in the method embodiment shown in FIG. 6. For example, the apparatus 800 includes a transceiver module 810 and a processing module 820.

The transceiver module 810 is configured to receive configuration information, where the configuration information is used to indicate a random access preamble length, a random access signal subcarrier spacing, and a data subcarrier spacing.

The processing module 820 is configured to determine a subcarrier quantity parameter based on at least one of the random access preamble length, the random access signal subcarrier spacing, and the data subcarrier spacing, where the subcarrier quantity parameter includes a first subcarrier quantity used to indicate a frequency resource start location of a random access preamble and a frequency resource start location of a physical random access channel, and/or a second subcarrier quantity used to indicate a frequency resource end location of the random access preamble and a frequency resource end location of the physical random access channel.

The processing module 820 is further configured to generate a random access signal based on the subcarrier quantity parameter.

The transceiver module 810 is further configured to send the random access signal.

Optionally, a value of the random access signal subcarrier spacing is any one of 120 kHz, 240 kHz, 480 kHz, 960 kHz, 1920 kHz, and 3840 kHz.

Optionally, a value of the data subcarrier spacing is any one of 240 kHz, 480 kHz, 960 kHz, 1920 kHz, and 3840 kHz.

Optionally, a value of the subcarrier quantity parameter is any one of −15, −7, −5, −3, −1, 0, 1, 2, 3, 19, 23, 83, and 107.

Optionally, the processing module 820 is specifically configured to:

determine a total subcarrier quantity frequency domain width based on the random access preamble length, the random access signal subcarrier spacing, and the data subcarrier spacing; and determine the subcarrier quantity parameter based on the total subcarrier quantity frequency domain width, the random access signal subcarrier spacing, and the data subcarrier spacing.

Optionally, the processing module 820 is specifically configured to:

determine the subcarrier quantity parameter in the second target parameter based on the random access signal subcarrier spacing and the data subcarrier spacing in the first target parameter.

Optionally, the first subcarrier quantity and the second subcarrier quantity are the same.

Optionally, the subcarrier quantity parameter $\bar{k}$ conforms to:

$$\bar{k} = \frac{\left(\frac{GP}{2} - \frac{\Delta f}{2}\right)}{\Delta f_{RA}} + 0.5,$$

where GP represents the total subcarrier quantity frequency domain width, $\Delta f$ represents the data subcarrier spacing, $\Delta f_{RA}$ represents the random access signal subcarrier spacing, and $\bar{k}$ represents the subcarrier quantity parameter.

Optionally, the first subcarrier quantity and the total subcarrier quantity frequency domain width are the same, and the second subcarrier quantity is zero.

Optionally, the subcarrier quantity parameter $\bar{k}$ conforms to:

$$\bar{k} = \frac{\Delta f}{2\Delta f_{RA}} + 0.5,$$

where GP represents the total subcarrier quantity frequency domain width, $\Delta f$ represents the data subcarrier spacing, $\Delta f_{RA}$ represents the random access signal subcarrier spacing, and $\bar{k}$ represents the subcarrier quantity parameter.

Optionally, the first subcarrier quantity is zero, and the second subcarrier quantity and the total subcarrier quantity frequency domain width are the same.

Optionally, the subcarrier quantity parameter $\bar{k}$ conforms to:

$$\bar{k} = \frac{\left(0 - \frac{\Delta f}{2}\right)}{\Delta f_{RA}} + 0.5,$$

where $\Delta f$ represents the data subcarrier spacing, $\Delta f_{RA}$ represents the random access signal subcarrier spacing, and $\bar{k}$ represents the subcarrier quantity parameter.

Figure 9:
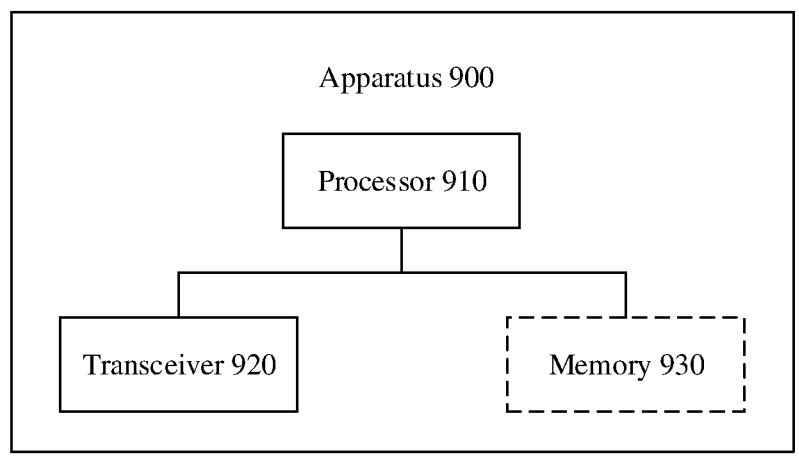
FIG. 9 is a schematic diagram of a structure of an apparatus for transmitting a random access signal according to an embodiment of this application.

FIG. 9 shows a communications apparatus 900 according to an embodiment of this application. The apparatus 900 may be the terminal in FIG. 6. The apparatus may use a hardware architecture shown in FIG. 9. The apparatus may include a processor 910 and a transceiver 920. Optionally, the apparatus may further include a memory 930. The processor 910, the transceiver 920, and the memory 930 communicate with each other by using an internal connection path. A related function implemented by the processing module 820 in FIG. 8 may be implemented by the processor 910, and a related function implemented by the transceiver module 810 may be implemented by the processor 910 controlling the transceiver 920.

Optionally, the processor 910 may be a general-purpose central processing unit (central processing unit, CPU), a microprocessor, an application-specific integrated circuit (application-specific integrated circuit, ASIC), a dedicated processor, or one or more integrated circuits configured to perform the technical solutions in the embodiments of this application. Alternatively, the processor herein may refer to one or more devices, circuits, and/or processing cores configured to process data (for example, computer program instructions). For example, the processor may be a baseband processor or a central processing unit. The baseband processor may be configured to process a communications protocol and communications data. The central processing unit may be configured to: control a communications apparatus (for example, a base station, a terminal, or a chip), execute a software program, and process data of the software program.

Optionally, the processor 910 may include one or more processors, for example, one or more central processing units (central processing unit, CPU). When the processor is one CPU, the CPU may be a single-core CPU, or may be a multi-core CPU.

The transceiver 920 is configured to send and receive data and/or signals. The transceiver may include a transmitter and a receiver. The transmitter is configured to send data and/or a signal, and the receiver is configured to receive data and/or a signal.

The memory 930 includes, but is not limited to, a random access memory (random access memory, RAM), a read-only memory (read-only memory, ROM), an erasable programmable memory (erasable programmable read only memory, EPROM), and a compact disc read-only memory (compact disc read-only memory, CD-ROM). The memory 930 is configured to store related instructions and data.

The memory 930 is configured to store program code and data of the terminal, and may be an independent component or integrated into the processor 910.

Specifically, the processor 910 is configured to control the transceiver to perform information transmission with a network device. For details, refer to the descriptions in the foregoing method embodiments. Details are not described herein again.

In specific implementation, in an embodiment, the apparatus 900 may further include an output device and an input device. The output device communicates with the processor 910, and may display information in a plurality of manners. For example, the output device may be a liquid crystal display (liquid crystal display, LCD), a light emitting diode (light emitting diode, LED) display device, a cathode ray tube (cathode ray tube, CRT) display device, or a projector (projector). The input device communicates with the processor 910, and may receive a user input in a plurality of manners. For example, the input device may be a mouse, a keyboard, a touchscreen device, or a sensor device.

It may be understood that FIG. 9 shows only a simplified design of the communications apparatus. In actual application, the apparatus may further include other necessary elements, including but not limited to any quantity of transceivers, processors, controllers, memories, or the like. All elements that can implement the terminal in this application fall within the protection scope of this application.

In a possible design, the apparatus 900 may be a chip, for example, may be a communications chip that may be used in the terminal, and is configured to implement a related function of the processor 910 in the terminal. The chip may be a field programmable gate array, a special integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal, or may be a circuit. The apparatus may be configured to perform an action performed by the terminal in the foregoing method embodiments.

Figure 10:
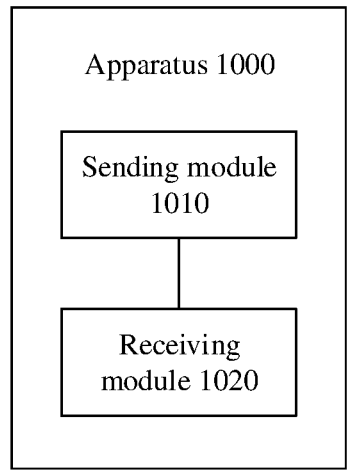
FIG. 10 is a schematic block diagram of an apparatus for transmitting a random access signal according to another embodiment of this application.

FIG. 10 is a schematic block diagram of an apparatus 1000 for transmitting a random access signal according to an embodiment of this application.

It should be understood that the apparatus 1000 may correspond to the network device shown in FIG. 1 or a chip in the network device, or the network device or a chip in the network device in the embodiment shown in FIG. 6, and may have any function of the network device in the method. For example, the apparatus 1000 includes a sending module 1010 and a receiving module 1020.

The sending module 1010 is configured to send configuration information, where the configuration information is used to indicate a random access preamble length, a random access signal subcarrier spacing, and a data subcarrier spacing.

The receiving module 1020 is configured to receive a random access signal, where the random access signal is generated based on a subcarrier quantity parameter, the subcarrier quantity parameter is determined by at least one of the random access preamble length, the random access signal subcarrier spacing, and the data subcarrier spacing, and the subcarrier quantity parameter includes a first subcarrier quantity used to indicate a frequency resource start location of a random access preamble and a frequency resource start location of a physical random access channel, and/or a second subcarrier quantity used to indicate a frequency resource end location of the random access preamble and a frequency resource end location of the physical random access channel.

Optionally, a value of the random access signal subcarrier spacing is any one of 120 kHz, 240 kHz, 480 kHz, 960 kHz, 1920 kHz, and 3840 kHz.

Optionally, a value of the data subcarrier spacing is any one of 240 kHz, 480 kHz, 960 kHz, 1920 kHz, and 3840 kHz.

Optionally, a value of the subcarrier quantity parameter is any one of −15, −7, −5, −3, −1, 0, 1, 2, 3, 19, 23, 83, and 107.

Optionally, the first subcarrier quantity and the second subcarrier quantity are the same.

Optionally, the random access signal subcarrier spacing, the data subcarrier spacing, and the subcarrier quantity parameter meet the following relationship:

$$\overline{k} = \frac{\left(\frac{GP}{2} - \frac{\Delta f}{2}\right)}{\Delta f_{RA}} + 0.5, \text{ and}$$

$$GP = \text{ceil}(L_{RA} * \Delta f_{RA}/(\Delta f * N)) * (\Delta f * N) - L_{RA} * \Delta f_{RA},$$

where $\Delta f$ represents the data subcarrier spacing, $\Delta f_{RA}$ represents the random access signal subcarrier spacing, $\overline{k}$ represents the subcarrier quantity parameter, and $L_{RA}$ represents the random access preamble length.

Optionally, the first subcarrier quantity and the total subcarrier quantity frequency domain width are the same, and the second subcarrier quantity is zero.

Optionally, the random access signal subcarrier spacing, the data subcarrier spacing, and the subcarrier quantity parameter meet the following relationship:

$$\overline{k} = \frac{\left(GP - \frac{\Delta f}{2}\right)}{\Delta f_{RA}} + 0.5, \text{ and}$$

$$GP = \text{ceil}(L_{RA} * \Delta f_{RA}/(\Delta f * N)) * (\Delta f * N) - L_{RA} * \Delta f_{RA},$$

where $\Delta f$ represents the data subcarrier spacing, $\Delta f_{RA}$ represents the random access signal subcarrier spacing, $\overline{k}$ represents the subcarrier quantity parameter, and $L_{RA}$ represents the random access preamble length.

Optionally, the random access signal subcarrier spacing, the data subcarrier spacing, and the subcarrier quantity parameter meet the following relationship:

$$\overline{k} = \frac{\left(GP + \frac{\Delta f}{2}\right)}{\Delta f_{RA}} + 0.5, \text{ and}$$

$$GP = \text{ceil}(L_{RA} * \Delta f_{RA}/(\Delta f * N)) * (\Delta f * N) - L_{RA} * \Delta f_{RA},$$

where $\Delta f$ represents the data subcarrier spacing, $\Delta f_{RA}$ represents the random access signal subcarrier spacing, $\overline{k}$ represents the subcarrier quantity parameter, and $L_{RA}$ represents the random access preamble length.

Optionally, the first subcarrier quantity is zero, and the second subcarrier quantity and the total subcarrier quantity frequency domain width are the same.

Optionally, the random access signal subcarrier spacing, the data subcarrier spacing, and the subcarrier quantity parameter meet the following relationship:

$$\bar{k} = \frac{\left(0 - \frac{\Delta f}{2}\right)}{\Delta f_{RA}} + 0.5,$$

where Δf represents the data subcarrier spacing, $\Delta f_{RA}$ represents the random access signal subcarrier spacing, and $\bar{k}$ represents the subcarrier quantity parameter.

Optionally, the random access signal subcarrier spacing, the data subcarrier spacing, and the subcarrier quantity parameter meet the following relationship:

$$\bar{k} = \frac{\Delta f}{2\Delta f_{RA}} + 0.5,$$

where Δf represents the data subcarrier spacing, $\Delta f_{RA}$ represents the random access signal subcarrier spacing, and $\bar{k}$ represents the subcarrier quantity parameter.

For more detailed descriptions of the sending module 1010 and the receiving module 1020, refer to related descriptions in the foregoing method embodiments. Details are not described herein again.

Figure 11:
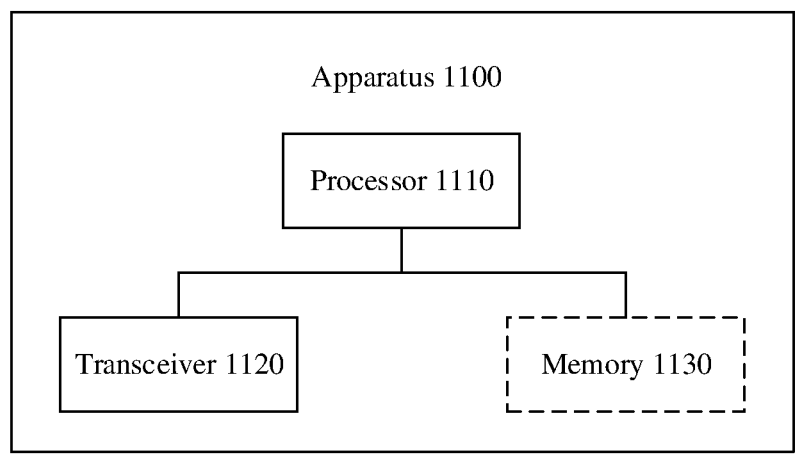
FIG. 11 is a schematic diagram of a structure of an apparatus for transmitting a random access signal according to another embodiment of this application.

FIG. 11 shows an apparatus 1100 for transmitting a random access signal according to an embodiment of this application. The apparatus 1100 may be the network device in FIG. 6. The apparatus may use a hardware architecture shown in FIG. 11. The apparatus may include a processor 1110 and a transceiver 1120. Optionally, the apparatus may further include a memory 1130. The processor 1110, the transceiver 1120, and the memory 1130 communicate with each other by using an internal connection path. A related function implemented by a processing module in the embodiment shown in FIG. 8 may be implemented by the processor 1110, and related functions implemented by the sending module 1010 and the receiving module 1020 may be implemented by the processor 1110 controlling the transceiver 1120.

Optionally, the processor 1110 may be a general-purpose central processing unit (central processing unit, CPU), a microprocessor, an application-specific integrated circuit (application-specific integrated circuit, ASIC), or one or more integrated circuits configured to perform the technical solutions in the embodiments of this application. Alternatively, the processor herein may refer to one or more devices, circuits, and/or processing cores configured to process data (for example, computer program instructions). For example, the processor may be a baseband processor or a central processing unit. The baseband processor may be configured to process a communications protocol and communications data. The central processing unit may be configured to: control a communications apparatus (for example, a base station, a terminal, or a chip), execute a software program, and process data of the software program.

Optionally, the processor 1110 may include one or more processors, for example, one or more central processing units (central processing unit, CPU). When the processor is one CPU, the CPU may be a single-core CPU, or may be a multi-core CPU.

The transceiver 1120 is configured to send and receive data and/or signals. The transceiver may include a transmitter and a receiver. The transmitter is configured to send data and/or a signal, and the receiver is configured to receive data and/or a signal.

The memory 1130 includes, but is not limited to, a random access memory (random access memory, RAM), a read-only memory (read-only memory, ROM), an erasable programmable memory (erasable programmable read only memory, EPROM), and a compact disc read-only memory (compact disc read-only memory, CD-ROM). The memory 1130 is configured to store related instructions and data.

The memory 1130 is configured to store program code and data of the network device, and may be an independent component or integrated into the processor 1110.

Specifically, the processor 1110 is configured to control the transceiver to perform information transmission with a terminal. For details, refer to the descriptions in the foregoing method embodiments. Details are not described herein again.

In specific implementation, in an embodiment, the apparatus 1100 may further include an output device and an input device. The output device communicates with the processor 1110, and may display information in a plurality of manners. For example, the output device may be a liquid crystal display (liquid crystal display, LCD), a light emitting diode (light emitting diode, LED) display device, a cathode ray tube (cathode ray tube, CRT) display device, or a projector (projector). The input device communicates with the processor 1110, and may receive a user input in a plurality of manners. For example, the input device may be a mouse, a keyboard, a touchscreen device, or a sensor device.

It may be understood that FIG. 11 shows only a simplified design of the communications apparatus. In actual application, the apparatus may further include other necessary elements, including but not limited to any quantity of transceivers, processors, controllers, memories, or the like. All elements that can implement the network device in this application fall within the protection scope of this application.

In a possible design, the apparatus 1100 may be a chip, for example, may be a communications chip that may be used in the network device, and is configured to implement a related function of the processor 1110 in the network device. The chip may be a field programmable gate array, a special integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a network device, or may be a circuit. The apparatus may be configured to perform an action performed by the network device in the foregoing method embodiments.

Figure 12:
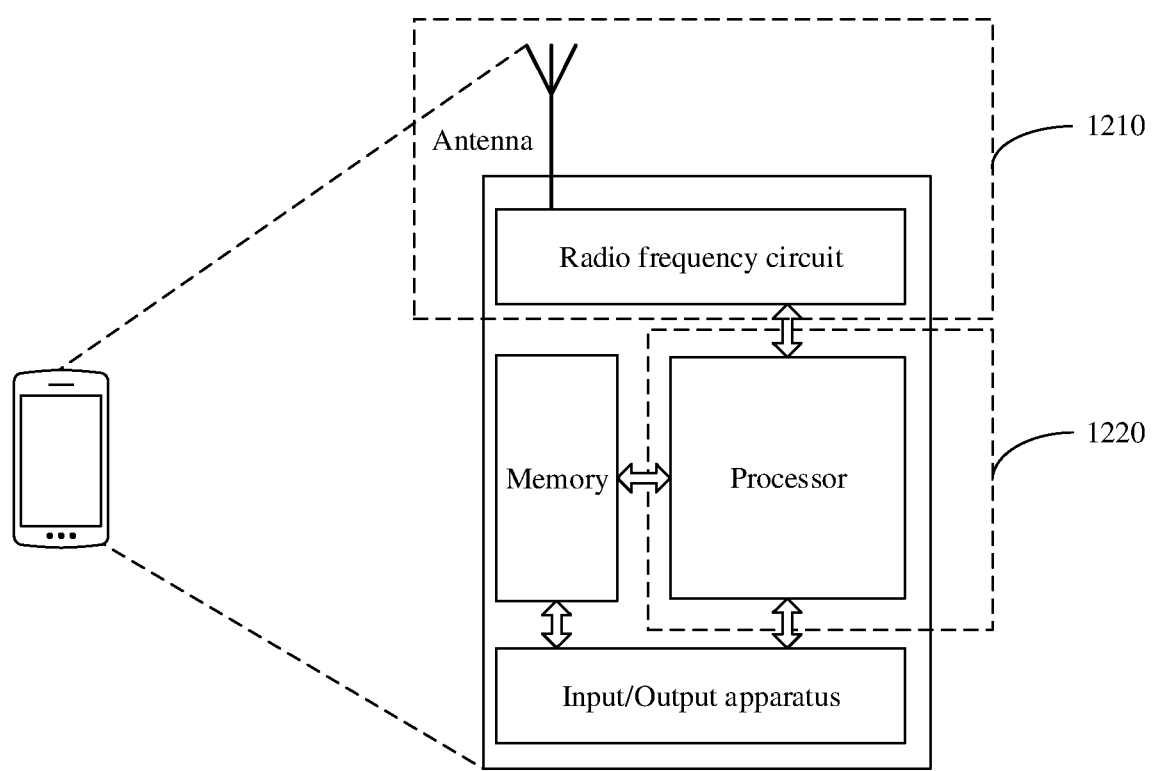
FIG. 12 is a schematic diagram of an apparatus for transmitting a random access signal according to another specific embodiment of this application.

Optionally, when the apparatus in the embodiments is a terminal, FIG. 12 is a schematic diagram of a simplified structure of a terminal. For ease of understanding and drawing, in FIG. 12, a mobile phone is used as an example of the terminal. As shown in FIG. 12, the terminal includes a processor, a memory, a radio frequency circuit, an antenna, and an input/output apparatus. The processor is mainly configured to: process a communications protocol and communications data, control the terminal, execute a software program, process data of the software program, and the like. The memory is mainly configured to store a software program and data. The radio frequency circuit is mainly configured to perform conversion between a baseband signal and a radio frequency signal and process the radio frequency signal. The antenna is mainly configured to receive and send radio frequency signals in a form of an electromagnetic wave. The input/output apparatus, for example, a touchscreen, a display, or a keyboard, is mainly configured to receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. An actual terminal product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the terminal, and the processor having a processing function may be considered as a processing unit of the terminal. As shown in FIG. 12, the terminal includes a transceiver unit 1210 and a processing unit 1220. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver, a transceiver circuit, or the like. The receiving unit sometimes may also be referred to as a receiver, a receiver circuit, or the like. The sending unit sometimes may also be referred to as a transmitter, a transmitter circuit, or the like.

It should be understood that, the transceiver unit 1210 is configured to perform a sending operation and a receiving operation on the terminal side in the foregoing method embodiments, and the processing unit 1220 is configured to perform another operation on the terminal in the foregoing method embodiments other than the receiving and sending operations.

For example, in an implementation, the processing unit 1220 is configured to perform processing step 602 and step 603 on the terminal side in FIG. 6. The transceiver unit 1210 is configured to perform receiving and sending operations in steps 601 and 604 in FIG. 6, and/or the transceiver unit 1210 is further configured to perform other receiving and sending steps on the terminal side in embodiments of this application.

When the apparatus is a chip, the chip includes a transceiver unit and a processing unit. The transceiver unit may be an input/output circuit or a communications interface. The processing unit is a processor, a microprocessor, or an integrated circuit integrated on the chip.

Figure 13:
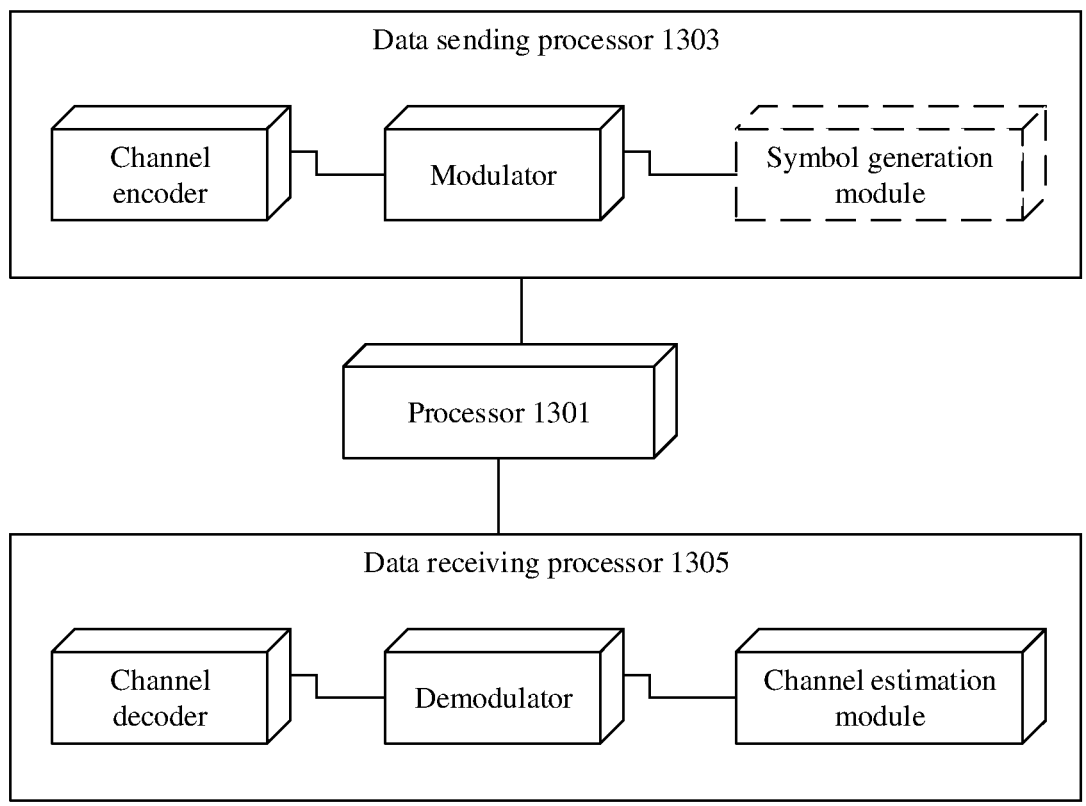
FIG. 13 is a schematic diagram of an apparatus for transmitting a random access signal according to another specific embodiment of this application.

Optionally, when the apparatus is a terminal, refer to an apparatus shown in FIG. 13. In an example, the apparatus may complete a function similar to that of the processor 910 in FIG. 9. In FIG. 13, the device includes: a processor 1301, a data sending processor 1303, and a data receiving processor 1305. The processing module 820 in the embodiment shown in FIG. 8 may be the processor 1301 in FIG. 13, and completes a corresponding function. The transceiver module 810 in the embodiment shown in FIG. 8 may be the data sending processor 1303 and the data receiving processor 1305 in FIG. 13. Although FIG. 13 shows a channel encoder and a channel decoder, it may be understood that these modules do not constitute a limitative description of the embodiments, but are only an example.

Figure 14:
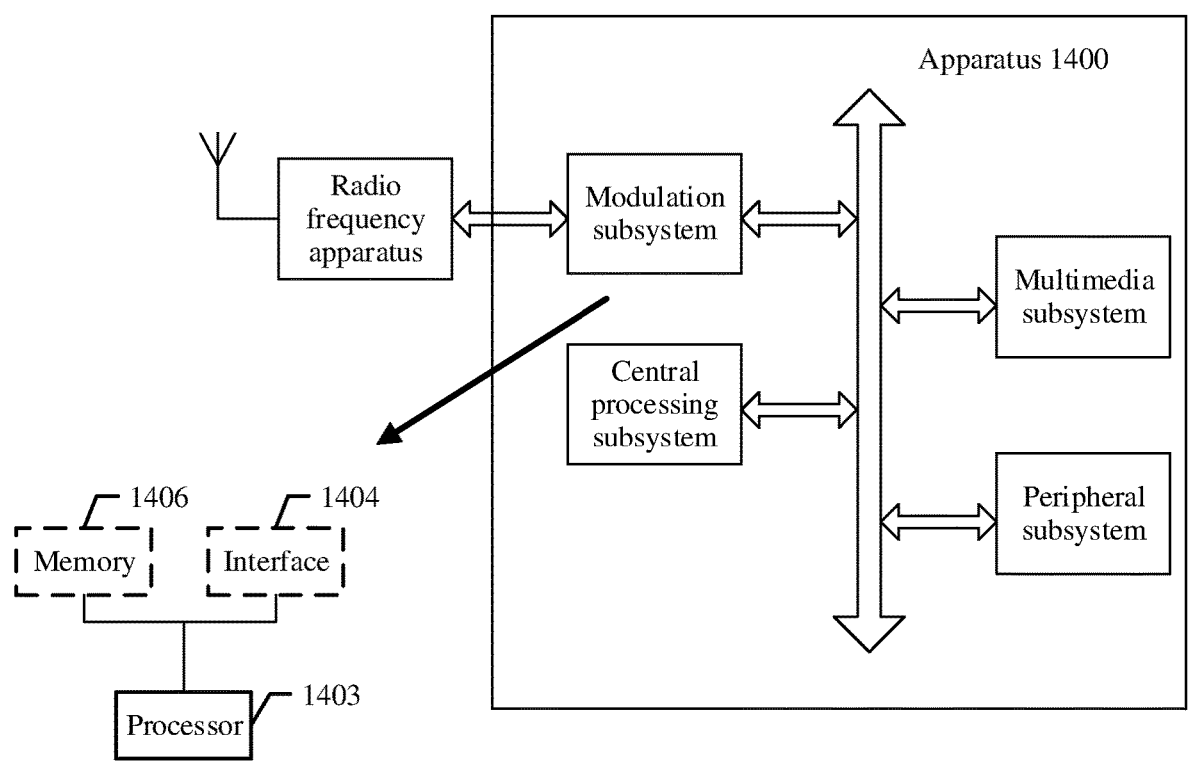
FIG. 14 is a schematic diagram of an apparatus for transmitting a random access signal according to another specific embodiment of this application.

FIG. 14 shows another form of the embodiments. A processing apparatus 1400 includes modules such as a modulation subsystem, a central processing subsystem, and a peripheral subsystem. The communications device in the embodiments may serve as a modulation subsystem therein. Specifically, the modulation subsystem may include a processor 1403 and an interface 1404. The processor 1403 completes a function of the processing module 820 in the embodiment shown in FIG. 8, and the interface 1404 completes a function of the transceiver module 810. In another variant, the modulation subsystem includes a memory 1406, a processor 1403, and a program stored in the memory and run on the processor, and when executed by the processor, the program implements the method described in the embodiments. It should be noted that the memory 1406 may be non-volatile or may be volatile, and may be located inside the modulation subsystem or in the processing apparatus 1400, provided that the memory 1406 can be connected to the processor 1403.

Figure 15:
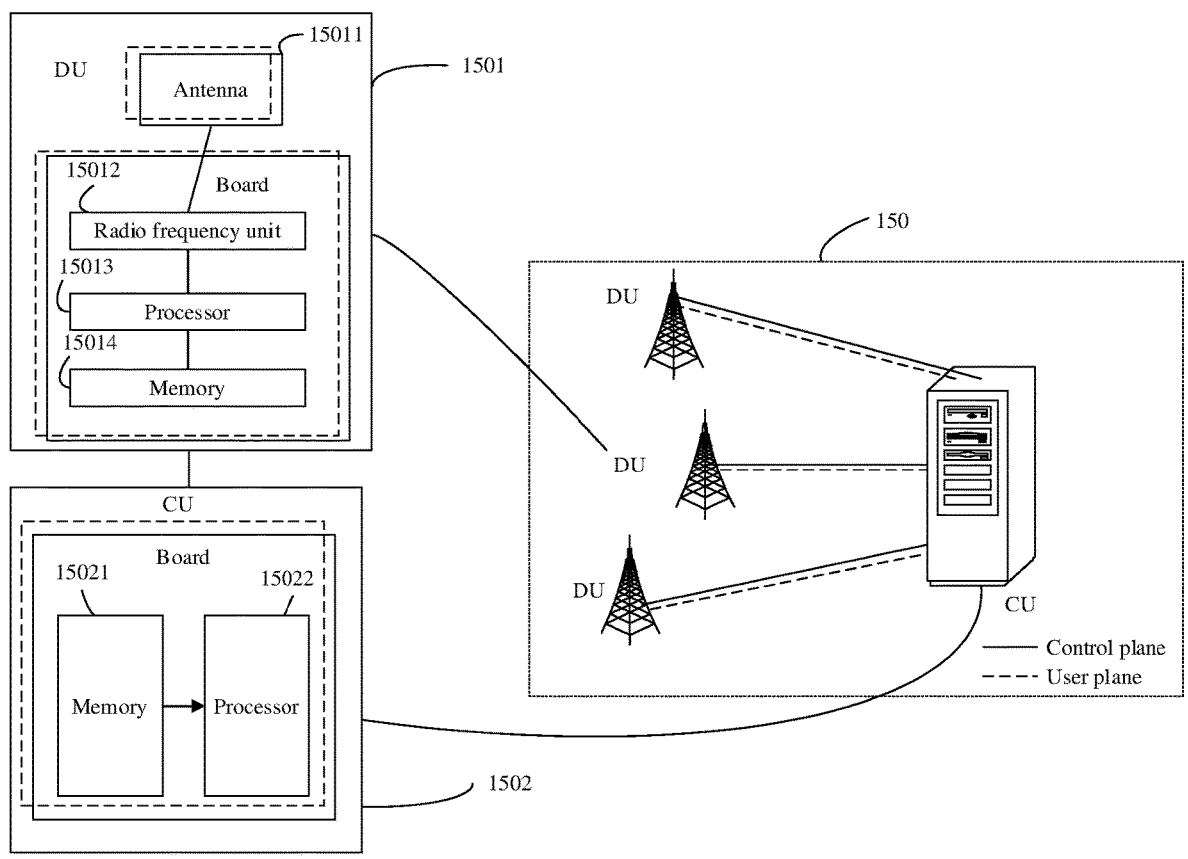
FIG. 15 is a schematic diagram of an apparatus for transmitting a random access signal according to another specific embodiment of this application.

When the apparatus in the embodiments is a network device, the network device may be shown in FIG. 15. For example, the apparatus 150 is a base station. The base station may be applied to the system shown in FIG. 1, to perform a function of the network device in the foregoing method embodiments. The base station 150 may include one or more DUs 1501 and one or more CUs 1502. The CU 1502 may communicate with a next generation core network (NG core, NC). The DU 1501 may include at least one antenna 15011, at least one radio frequency unit 15012, at least one processor 15013, and at least one memory 15014. The DU 1501 part is mainly configured for receiving and sending of radio frequency signals, conversion between a radio frequency signal and a baseband signal, and some baseband processing. The CU 1502 may include at least one processor 15022 and at least one memory 15021. The CU 1502 and the DU 1501 may communicate by using an interface. A control plane (control plane) interface may be Fs-C, for example, F1-C, and a user plane (user plane) interface may be Fs-U, for example, F1-U.

The CU 1502 part is mainly configured to perform baseband processing, control the base station, and the like. The DU 1501 and the CU 1502 may be physically disposed together, or may be physically disposed separately, that is, a distributed base station. The CU 1502 is a control center of the base station, may also be referred to as a processing unit, and may be configured to complete baseband processing functions. For example, the CU 1502 may be configured to control the base station to perform an operation procedure related to the network device in the foregoing method embodiments.

Specifically, baseband processing on the CU and the DU may be divided based on wireless network protocol layers. For example, functions of a packet data convergence layer protocol (packet data convergence protocol, PDCP) layer and an upper protocol layer are set on the CU, protocol layers below the PDCP, for example, a radio link control (radio link control, RLC) layer and a medium access control (medium access control, MAC) layer are set on the DU. For another example, the CU implements functions of radio resource control (radio resource control, RRC) and packet data convergence protocol (packet data convergence protocol, PDCP) layers, and the DU implements functions of radio link control (radio link control, RLC), MAC, and physical (physical, PHY) layers.

In addition, optionally, the base station 150 may include one or more radio frequency units (RUs), one or more DUs, and one or more CUs. The DU may include at least one processor 15013 and at least one memory 15014, the RU may include at least one antenna 15011 and at least one radio frequency unit 15012, and the CU may include at least one processor 15022 and at least one memory 15021.

For example, in an implementation, the processor 15013 is configured to perform a processing step on the network device side in FIG. 6. The radio frequency unit 15012 is configured to perform receiving and sending operations in steps 601 and 604 in FIG. 6.

In an example, the CU 1502 may include one or more boards. A plurality of boards may all support a radio access network of a single access standard (for example, a 5G network), or may respectively support radio access networks of different access standards (for example, an LTE network, a 5G network, or other networks). The memory 15021 and the processor 15022 may serve one or more boards. In other words, a memory and a processor may be deployed on each board. Alternatively, a plurality of boards may share a same memory and a same processor. In addition, a necessary circuit may be further disposed on each board. The DU 1501 may include one or more boards. A plurality of boards may all support a radio access network of a single access standard (for example, a 5G network), or may respectively support radio access networks of different access standards (for example, an LTE network, a 5G network, or other networks). The memory 15014 and the processor 15013 may serve one or more boards. In other words, a memory and a processor may be deployed on each board. Alternatively, a plurality of boards may share a same memory and a same processor. In addition, a necessary circuit may be further disposed on each board.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

It should be understood that the processor may be an integrated circuit chip and has a signal processing capability. In an implementation process, steps in the foregoing method embodiments may be implemented by using a hardware integrated logic circuit in the processor, or by using instructions in a form of software. The processor may be a general purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example and not limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchronous link DRAM, SLDRAM), and a direct rambus random access memory (direct rambus RAM, DR RAM).

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects. "At least one of the following" or a similar expression thereof refers to any combination of these items, including a singular item or any combination of plural items. For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in embodiments of this application. The execution sequences of the processes should be determined based on functions and internal logic of the processes, and should not constitute any limitation on implementation processes of the embodiments of this application.

Terms such as "component", "module", and "system" used in this specification are used to indicate a computer-related entity, hardware, firmware, a combination of hardware and software, software, or software being executed. For example, a component may be, but is not limited to, a process that is run on a processor, a processor, an object, an executable file, a thread of execution, a program, and/or a computer. As illustrated by using figures, both a computing device and an application that is run on the computing device may be components. One or more components may reside within a process and/or a thread of execution, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, in a distributed system, and/or across a network such as the Internet interacting with other systems by using the signal).

It should be further understood that, "first", "second", and various numbers in this specification are merely used for differentiation for ease of description, and are not intended to limit the scope of embodiments of this application.

It should be understood that the term "and/or" in this specification describes only an association relationship between associated objects and represents that three relationships may exist. For example, A and/or B may represent the following three cases: Only A exists, both A and B exist, and only B exists. When only A or B exists, a quantity of A or B is not limited. For example, when only A exists, it may be understood as that there are one or more As.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the foregoing apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a random access signal, comprising:
   receiving configuration information, wherein the configuration information indicates a random access preamble length, a random access signal subcarrier spacing, and a data subcarrier spacing;
   determining a subcarrier quantity parameter $\bar{K}$ based on at least one of the random access preamble length, the random access signal subcarrier spacing, or the data subcarrier spacing, wherein at least one of a value of the random access signal subcarrier spacing is 120 kHz, and a value of the data subcarrier spacing is any one of 240 kHz, 480 kHz, 960 kHz, 1920 kHz, 3840 kHz, or a value of the random access signal subcarrier spacing is 480 kHz, and a value of the data subcarrier spacing is any one of 120 kHz, 240 kHz, 480 kHz, 960 kHz, 1920 kHz, 3840 kHz, or a value of the random access signal subcarrier spacing is 960 kHz, wherein a value of the data subcarrier spacing is any one of 120 kHz, 240 kHz, 480 kHz, 960 kHz, 1920 kHz, 3840 kHz;

generating a random access signal based on the subcarrier quantity parameter $\overline{k}$; and sending the random access signal.

2. The method according to claim 1, wherein the subcarrier quantity parameter $\overline{k}$ conforms to at least one of:

$$\overline{k} = \mathrm{floor}\left(\frac{\left(\frac{GP}{2} - \frac{\Delta f}{2}\right)}{\Delta f_{RA}} + 0.5\right) \text{ or}$$

$$\overline{k} = \mathrm{floor}\left(\frac{\left((12N_{RB}^{RA} - 1) \times \Delta f - (L_{RA} - 1) \times \Delta f_{RA}\right)}{2\Delta f_{RA}}\right);$$

wherein $GP = N_{RB}^{RA} * (\Delta f * N) - L_{RA} * \Delta f_{RA}$, wherein $\Delta f$ represents the data subcarrier spacing, wherein $\Delta f_{RA}$ represents the random access signal subcarrier spacing, wherein $\overline{k}$ represents the subcarrier quantity parameter, wherein $N_{RB}^{RA}$ represents total quantity of frequency domain resource blocks allocated to the random access signal, wherein N represents the number of subcarriers in one resource block (RB), wherein N=12, and wherein $L_{RA}$ represents the length of the random access preamble.

3. The method according to claim 1, wherein $L_{RA}$, $\Delta f$, $\Delta f_{RA}$, and $\overline{k}$ meet at least one of:

| $L_{RA}$ | $\Delta f_{RA}$ | $\Delta f$ | $\overline{k}$ |
|---|---|---|---|
| 139 | 120 | 480 | 1 |
| 139 | 120 | 960 | 23 |
| 139 | 480 | 480 | 2 |
| 139 | 480 | 960 | 2 |
| 139 | 960 | 960 | 2 |
| 571 | 120 | 480 | 1 |
| 571 | 480 | 960 | 2 | wherein $\Delta f$ represents the data subcarrier spacing, wherein $\Delta F_{RA}$ represents the random access signal subcarrier spacing, wherein $\overline{k}$ represents the subcarrier quantity parameter, and wherein $L_{RA}$ represents the random access preamble length.

4. The method according to claim 1, wherein $L_{RA}$, $\Delta f$, $\Delta f_{RA}$, and $\overline{k}$ meet at least one of:

| $L_{RA}$ | $\Delta f_{RA}$ | $\Delta f$ | $\overline{k}$ |
|---|---|---|---|
| 139 | 960 | 480 | 2 |
| 571 | 480 | 480 | 2 | wherein $\Delta f$ represents the data subcarrier spacing, wherein $\Delta f_{RA}$ represents the random access signal subcarrier spacing, wherein $\overline{k}$ represents the subcarrier quantity parameter, and wherein $L_{RA}$ represents the random access preamble length.

5. A method for transmitting a random access signal, comprising:

sending configuration information, wherein the configuration information indicates a random access preamble length, a random access signal subcarrier spacing, and a data subcarrier spacing; and receiving a random access signal, wherein the random access signal is generated based on a subcarrier quantity parameter $\overline{k}$, wherein the subcarrier quantity parameter $\overline{k}$ is determined by at least one of the random access preamble length, the random access signal subcarrier spacing, or the data subcarrier spacing, wherein at least one of a value of the random access signal subcarrier spacing is 120 kHz, wherein a value of the data subcarrier spacing is any one of 240 kHz, 480 kHz, 960 kHz, 1920 kHz, 3840 kHz, or a value of the random access signal subcarrier spacing is 480 kHz, wherein a value of the data subcarrier spacing is any one of 120 kHz, 240 kHz, 480 kHz, 960 kHz, 1920 kHz, 3840 kHz, or a value of the random access signal subcarrier spacing is 960 kHz, wherein a value of the data subcarrier spacing is any one of 120 kHz, 240 kHz, 480 kHz, 960 kHz, 1920 kHz, 3840 kHz.

6. The method according to claim 5, wherein the subcarrier quantity parameter $\overline{k}$ conforms to:

$$\overline{k} = \mathrm{floor}\left(\frac{\left(\frac{GP}{2} - \frac{\Delta f}{2}\right)}{\Delta f_{RA}} + 0.5\right),$$

wherein $$\overline{k} = \frac{\left(\frac{GP}{2} - \frac{y}{2}\right)}{\Delta f_{RA}} + 0.5, \text{ or}$$

$$\overline{k} = \mathrm{floor}\left(\frac{\left((12N_{RB}^{RA} - 1) \times \Delta f - (L_{RA} - 1) \times \Delta f_{RA}\right)}{2\Delta f_{RA}}\right),$$

wherein $GP = N_{RB}^{RA} * (\Delta f * N) - L_{RA} * \Delta f_{RA}$, wherein $\Delta f$ represents the data subcarrier spacing, wherein $\Delta f_{RA}$ represents the random access signal subcarrier spacing, wherein $\overline{k}$ represents the subcarrier quantity parameter, wherein $N_{RB}^{RA}$ represents total quantity of frequency domain resource blocks allocated to the random access signal, wherein N represents the number of subcarriers in one resource block RB, wherein N=12, wherein $L_{RA}$ represents the length of the random access preamble.

7. The method according to claim 5, wherein $L_{RA}$, $\Delta f$, $\Delta f_{RA}$, and $\overline{k}$ meet at least one of:

| $L_{RA}$ | $\Delta f_{RA}$ | $\Delta f$ | $\overline{k}$ |
|---|---|---|---|
| 139 | 120 | 480 | 1 |
| 139 | 120 | 960 | 23 |
| 139 | 480 | 480 | 2 |
| 139 | 480 | 960 | 2 |
| 139 | 960 | 960 | 2 |
| 571 | 120 | 480 | 1 |
| 571 | 480 | 960 | 2. |

8. The method according to claim 5, wherein $L_{RA}$ $\Delta f$, $\Delta f_{RA}$, and $\bar{k}$ meet at least one of:

| $L_{RA}$ | $\Delta f_{RA}$ | $\Delta f$ | $\bar{k}$ |
|---|---|---|---|
| 139 | 960 | 480 | 2 |
| 571 | 480 | 480 | 2. |

9. An apparatus for transmitting a random access signal, comprising:
   a transceiver;
   a processor; and
   a non-transitory computer readable medium storing a program for execution by the processor, the program including instructions to:
      receive, through the transceiver, configuration information, wherein the configuration information indicate a random access preamble length, a random access signal subcarrier spacing, and a data subcarrier spacing:
      determine a subcarrier quantity parameter $\bar{k}$ based on at least one of the random access preamble length, the random access signal subcarrier spacing, and the data subcarrier spacing;
      generate a random access signal based on the subcarrier quantity parameter $\bar{k}$; and
      cause the transceiver to send the random access signal;
      wherein at least one of a value of the random access signal subcarrier spacing is 120 kHz, wherein a value of the data subcarrier spacing is any one of 240 kHz, 480 kHz, 960 kHz, 1920 kHz, 3840 kHz, or a value of the random access signal subcarrier spacing is 480 kHz, wherein a value of the data subcarrier spacing is any one of 120 kHz, 240 kHz, 480 kHz, 960 kHz, 1920 kHz, 3840 kHz or a value of the random access signal subcarrier spacing is 960 kHz, wherein a value of the data subcarrier spacing is any one of 120 kHz, 240 kHz, 480 kHz, 960 kHz, 1920 kHz, 3840 kHz.

10. The apparatus according to claim 9, wherein the subcarrier quantity parameter $\bar{k}$ conforms to at least one of:

$$\bar{k} = \text{floor}\left(\frac{\left(\frac{GP}{2} - \frac{\Delta f}{2}\right)}{\Delta f_{RA}} + 0.5\right), \text{ or}$$

$$\bar{k} = \text{floor}\left(\frac{((12N_{RB}^{RA} - 1) \times \Delta f - (L_{RA} - 1) \times \Delta f_{RA})}{2\Delta f_{RA}}\right);$$

wherein $GP = N_{RB}^{RA} * (\Delta f * N) - L_{RA} * \Delta f_{RA}$, $\Delta f$ represents the data subcarrier spacing, wherein $\Delta f_{RA}$ represents the random access signal subcarrier spacing, and wherein $\bar{k}$ represents the subcarrier quantity parameter, wherein $N_{RB}^{RA}$ represents total quantity of frequency domain resource blocks allocated to the random access signal, wherein N represents the number of subcarriers in one resource block RB, wherein N=12, and wherein $L_{RA}$ represents the length of the random access preamble.

11. The apparatus according to claim 9, wherein $L_{RA}$, $\Delta f$, $\Delta f_{RA}$, and $\bar{k}$ meet at least one of:

| $L_{RA}$ | $\Delta f_{RA}$ | $\Delta f$ | $\bar{k}$ |
|---|---|---|---|
| 139 | 120 | 480 | 1 |
| 139 | 120 | 960 | 23 |
| 139 | 480 | 480 | 2 |
| 139 | 480 | 960 | 2 |
| 139 | 960 | 960 | 2 |
| 571 | 120 | 480 | 1 |
| 571 | 480 | 960 | 2 | wherein $\Delta f$ represents the data subcarrier spacing, wherein $\Delta f_{RA}$ represents the random access signal subcarrier spacing, wherein $\bar{k}$ represents the subcarrier quantity parameter, and wherein $L_{RA}$ represents the random access preamble length.

12. The apparatus according to claim 9, wherein $L_{RA}$, $\Delta f$, $\Delta f_{RA}$, and $\bar{k}$ meet at least one of:

| $L_{RA}$ | $\Delta f_{RA}$ | $\Delta f$ | $\bar{k}$ |
|---|---|---|---|
| 139 | 960 | 480 | 2 |
| 571 | 480 | 480 | 2 | wherein $\Delta f$ represents the data subcarrier spacing, wherein $\Delta f_{RA}$ represents the random access signal subcarrier spacing, wherein $\bar{k}$ represents the subcarrier quantity parameter, and wherein $L_{RA}$ represents the random access preamble length.

13. An apparatus for transmitting a random access signal, comprising:
   a transceiver;
   a processor;
   a non-transitory computer readable medium storing a program for execution by the processor, the program including instructions to:
      cause the transceiver to send configuration information, wherein the configuration information is used to indicate a random access preamble length, a random access signal subcarrier spacing, and a data subcarrier spacing; and
      receive, through the transceiver, a random access signal, wherein the random access signal is generated based on a subcarrier quantity parameter $\bar{k}$, the subcarrier quantity parameter is determined by at least one of the random access preamble length, the random access signal subcarrier spacing, or the data subcarrier spacing; and
      wherein at least one of a value of the random access signal subcarrier spacing is 120 kHz, wherein a value of the data subcarrier spacing is any one of 240 kHz, 480 kHz, 960 kHz, 1920 kHz, 3840 kHz, or wherein a value of the random access signal subcarrier spacing is 480 kHz, wherein a value of the data subcarrier spacing is any one of 120 kHz, 240 kHz, 480 kHz, 960 kHz, 1920 kHz, 3840 kHz, or wherein a value of the random access signal subcarrier spacing is 960 kHz, wherein a value of the data subcarrier spacing is any one of 120 kHz, 240 kHz, 480 kHz, 960 kHz, 1920 kHz, 3840 kHz.

14. The apparatus according to claim 13, wherein the subcarrier quantity parameter $\bar{k}$ conforms to:

$$\bar{k} = \text{floor}\left(\frac{\left(\frac{GP}{2} - \frac{\Delta f}{2}\right)}{\Delta f_{RA}} + 0.5\right);$$

wherein $$\bar{k} = \left\lceil \frac{\left(\frac{GP}{2} - \frac{\Delta f}{2}\right)}{\Delta f_{RA}} + 0.5 \right\rceil, \text{ or}$$

$$\bar{k} = \text{floor}\left(\frac{\left((12N_{RB}^{RA} - 1) \times \Delta f - (L_{RA} - 1) \times \Delta f_{RA}\right)}{2\Delta f_{RA}}\right),$$

wherein $GP = N_{RB}^{RA} * (\Delta f * N) - L_{RA} * \Delta f_{RA}$, $\Delta f$ represents the data subcarrier spacing, wherein $\Delta f_{RA}$ represents the random access signal subcarrier spacing, wherein $\bar{k}$ represents the subcarrier quantity parameter, wherein $N_{RB}^{RA}$ represents total quantity of frequency domain resource blocks allocated to the random access signal, wherein N represents the number of subcarriers in one resource block RB, wherein N=12, and wherein $L_{RA}$ represents the length of the random access preamble.

15. The apparatus according to claim 13, wherein $L_{RA}$, $\Delta f$, $\Delta f_{RA}$, and $\bar{k}$ meet at least one of:

| $L_{RA}$ | $\Delta f_{RA}$ | $\Delta f$ | $\bar{k}$ |
|---|---|---|---|
| 139 | 120 | 480 | 1 |
| 139 | 120 | 960 | 23 |
| 139 | 480 | 480 | 2 |
| 139 | 480 | 960 | 2 |
| 139 | 960 | 960 | 2 |
| 571 | 120 | 480 | 1 |
| 571 | 480 | 960 | 2 | wherein $\Delta f$ represents the data subcarrier spacing, $\Delta f_{RA}$ represents the random access signal subcarrier spacing, wherein $\bar{k}$ represents the subcarrier quantity parameter, and wherein $L_{RA}$ represents the random access preamble length.

16. The apparatus according to claim 13, wherein $L_{RA}$, $\Delta f$, $\Delta f_{RA}$, and $\hat{k}$ meet at least one of:

| $L_{RA}$ | $\Delta f_{RA}$ | $\Delta f$ | $\bar{k}$ |
|---|---|---|---|
| 139 | 960 | 480 | 2 |
| 571 | 480 | 480 | 2. |

* * * * *

UNITED STATES PATENT AND TRADEMARK OFFICE
CERTIFICATE OF CORRECTION

PATENT NO. : 12,328,770 B2  
APPLICATION NO. : 17/957905  
DATED : June 10, 2025  
INVENTOR(S) : Huang et al.

Page 1 of 1

It is certified that error appears in the above-identified patent and that said Letters Patent is hereby corrected as shown below:

In the Specification

In Column 2, Line 18, delete "anyone" and insert -- any one --.

In Column 6, Line 52, delete "anyone" and insert -- any one --.

In Column 8, Line 13, delete "anyone" and insert -- any one --.

In Column 18, Line 53, delete "6." and insert -- ±6. --.

In Column 21, Line 53, delete "x." and insert -- ×. --.

In Column 23, Line 54, delete "41" and insert -- 47 --.

In Column 31, Line 38, delete "41" and insert -- 47 --.

In Column 32, Line 14, delete "41" and insert -- 47 --.

In the Claims

In Column 49, in Claim 3, Line 50, delete "$\Delta F_{RA}$" and insert -- $\Delta f_{RA}$ --.

In Column 50, in Claim 6, Line 39, delete "$\frac{y}{2}$" and insert -- $\frac{\Delta f}{2}$ --.

In Column 51, in Claim 8, Line 1, delete "$L_{RA}$" and insert -- $L_{RA,}$ --.

In Column 52, in Claim 12, Line 15, delete "$\Delta_{f,}$" and insert -- $\Delta f,$ --.

In Column 54, in Claim 16, Line 20, delete "$\hat{k}$" and insert -- $\bar{k}$ --.

Signed and Sealed this  
Fifteenth Day of July, 2025

Coke Morgan Stewart  
*Acting Director of the United States Patent and Trademark Office*